United States Patent
Chung et al.

(10) Patent No.: US 8,958,841 B2
(45) Date of Patent: Feb. 17, 2015

(54) METHOD AND APPARATUS FOR CONTROLLING UPLINK TRANSMISSION POWER IN A MULTI-CARRIER WIRELESS COMMUNICATION SYSTEM

(75) Inventors: Jae Hoon Chung, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 13/503,611

(22) PCT Filed: Dec. 27, 2010

(86) PCT No.: PCT/KR2010/009372
§ 371 (c)(1),
(2), (4) Date: Apr. 23, 2012

(87) PCT Pub. No.: WO2011/078631
PCT Pub. Date: Jun. 30, 2011

(65) Prior Publication Data
US 2012/0208583 A1     Aug. 16, 2012

Related U.S. Application Data

(60) Provisional application No. 61/290,238, filed on Dec. 27, 2009.

(51) Int. Cl.
    *H04B 7/00*           (2006.01)
    *H04W 52/14*        (2009.01)
    *H04L 5/00*           (2006.01)
    *H04L 27/26*         (2006.01)
    *H04W 52/10*        (2009.01)
    *H04W 52/54*        (2009.01)

(52) U.S. Cl.
    CPC ............ *H04W 52/146* (2013.01); *H04L 5/001* (2013.01); *H04L 27/2626* (2013.01); *H04W 52/10* (2013.01); *H04W 52/54* (2013.01)
    USPC ......................................................... 455/522

(58) Field of Classification Search
None
See application file for complete search history.

(56) References Cited

U.S. PATENT DOCUMENTS

| | | | |
|---|---|---|---|
| 8,467,352 B2 * | 6/2013 | Hu et al. | ........................ 370/335 |
| 2010/0208685 A1 | 8/2010 | Kim et al. | |
| 2010/0254292 A1 | 10/2010 | Kim et al. | |
| 2011/0081939 A1 * | 4/2011 | Damnjanovic et al. | ........ 455/522 |

FOREIGN PATENT DOCUMENTS

| | | |
|---|---|---|
| KR | 10-2009-0038654 A | 4/2009 |
| KR | 10-2009-0063085 A | 6/2009 |
| KR | 10-2009-0097805 A | 9/2009 |

* cited by examiner

*Primary Examiner* — Fayyaz Alam
*Assistant Examiner* — Mohammed Rachedine
(74) *Attorney, Agent, or Firm* — Birch, Stewart, Kolasch & Birch, LLP

(57) ABSTRACT

The present invention relates to a method for controlling uplink transmission power in a multi-carrier wireless communication system comprising: receiving, from a base station, downlink control information containing an uplink transmission power control command, and one or more pieces of uplink carrier indicator information for indicating an uplink carrier to which the uplink transmission power control command is to be applied; determining an uplink carrier, to which the uplink transmission power control command is to be applied, on the basis of said one or more pieces of uplink carrier indicator information; determining a transmission power for the determined uplink carrier one the basis of the downlink control information; and transmitting, to the base station, an uplink signal on the determined uplink carrier on the basis of the determined transmission power.

16 Claims, 14 Drawing Sheets

| TPC command 1 | TPC command 2 | TPC command 3 | TPC command 4 | ... | TPC command 14 | TPC command 15 | parity bits |
|---|---|---|---|---|---|---|---|
| 2bits | 2bits | 2bits | 2bits | | 2bits | 2bits | 12bits |

| tpc-Index 1 | tpc-Index 2 | tpc-Index 3 | tpc-Index 4 | ... | tpc-Index 14 | tpc-Index 15 |
|---|---|---|---|---|---|---|

FIG. 9

| TPC command 1 | TPC command 2 | TPC command 3 | TPC command 4 | ... | TPC command 30 | TPC command 31 | parity bits |
|---|---|---|---|---|---|---|---|
| 1bit | 1bit | 1bit | 1bit | | 1bit | 1bit | 11bits |

| tpc-Index 1 | tpc-Index 2 | tpc-Index 3 | tpc-Index 4 | ... | tpc-Index 30 | tpc-Index 31 |
|---|---|---|---|---|---|---|

FIG. 11

| TPC command 1 | TPC command 2 | TPC command 3 | TPC command 4 | ... | TPC command 14 | TPC command 15 | parity bits |
|---|---|---|---|---|---|---|---|
| 2bits | 2bits | 2bits | 2bits | | reserved | reserved | 12bits |

| tpc-Index 1 | tpc-Index 2 | tpc-Index 3 | tpc-Index 4 | ... | reserved or N/A | reserved or N/A |
|---|---|---|---|---|---|---|

FIG. 12

| TPC command 1 | TPC command 2 | TPC command 3 | TPC command 4 | ... | TPC command 30 | TPC command 31 | parity bits |
|---|---|---|---|---|---|---|---|
| 1bit | 1bit | 1bit | 1bit | | reserved | reserved | 11bits |

| tpc-Index 1 | tpc-Index 2 | tpc-Index 3 | tpc-Index 4 | ... | reserved or N/A | reserved or N/A |
|---|---|---|---|---|---|---|

METHOD AND APPARATUS FOR CONTROLLING UPLINK TRANSMISSION POWER IN A MULTI-CARRIER WIRELESS COMMUNICATION SYSTEM

CROSS REFERENCE TO RELATED APPLICATIONS

This application is the National Phase of PCT/KR2010/009372 filed on Dec. 27, 2010, which claims priority under 35 U.S.C. 119(e) to U.S. Provisional Application No. 61/290,238 filed on Dec. 27, 2009, all of which are hereby expressly incorporated by reference into the present application.

FIELD OF THE INVENTION

The present invention relates to a wireless communication system and, more particularly, to a method and apparatus for controlling uplink transmission power in a multi-carrier wireless communication system.

BACKGROUND ART

A multiple carrier technology may also be referred to as a carrier aggregation technology. Unlike the conventional method of using a single carrier in an uplink and a downlink in a general wireless communication system, the multiple carrier technology corresponds to a technology of physically grouping multiple carriers in a frequency domain in order to support an extended bandwidth, so as to produce an effect of logically using a frequency bandwidth having a large band.

Meanwhile, a Transmit Power Control Command (or transmission power control command) for controlling an uplink transmission power of a user equipment may be provided to the user equipment through a downlink control channel transmitted from a base station.

DETAILED DESCRIPTION OF THE INVENTION

Technical Objects

Since the conventional wireless communication system supports only one carrier in an uplink, no problem occurred even if the base station has not specified the carrier when providing the uplink transmit power control command. However, in a wireless communication system supporting multiple carriers, the corresponding wireless communication system supports multiple carriers in an uplink. Therefore, if the conventional transmit power control command is used without any modification, an ambiguity may occur in determining to which uplink carrier the transmit power control command is being applied.

Therefore, in the present invention, a technical object of the present invention is to provide a method and apparatus for controlling transmission power that enables a transmission power control command to be accurately and efficiently provided in a wireless communication system supporting multiple carriers, and that enables an uplink transmission subject to transmit a target uplink carrier at a transmission power, which is decided based upon the corresponding transmission power control command.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the object of the present invention, according to an aspect of the present invention, in a user equipment of a wireless communication system supporting multiple carriers, a method for performing uplink transmit power control may include the steps of receiving downlink control information and at least one or more uplink carrier indicator information from a base station, wherein the downlink control information includes an uplink transmit power control command, and wherein the at least one or more uplink carrier indicator information indicates an uplink carrier to which the uplink transmit power control command is applied; deciding an uplink carrier, to which the uplink transmit power control command is to be applied, based upon the at least one or more uplink carrier indicator information; deciding a transmit power respective to the decided uplink carrier based upon the downlink control information; and transmitting an uplink signal to the base station based upon the decided transmit power over the decided uplink carrier.

Also, the at least one or more uplink carrier indicator information may be included in a reserved portion, among the transmit power control command bits of the downlink control information.

Also, the at least one or more uplink carrier indicator information may be included in a reserved portion, among parity bits of the downlink control information.

Also, the at least one or more uplink carrier indicator information may be provided via higher layer signaling.

Also, the at least one or more uplink carrier indicator information may be decided based upon linkage settings between a transmit power control command index (tpc-Index) designating the uplink transmit power control command and the at least one or more uplink carrier indicator information.

Also, the linkage settings between the transmit power control command index and the at least one or more uplink carrier indicator information may either be decided by performing higher layer signaling, or may be decided in accordance with a mapping order by which the at least one or more uplink carrier indicator information is mapped to a payload.

Also, the at least one or more uplink carrier indicator information may be provided either when a downlink carrier and an uplink carrier do not configure a one-to-one mapping relation, or when a cross-carrier scheduling is performed.

In order to achieve the object of the present invention, according to another aspect of the present invention, in a base station of a wireless communication system supporting multiple carriers, a method for providing uplink transmit power control includes the steps of transmitting downlink control information and at least one or more uplink carrier indicator information to a user equipment, wherein the downlink control information includes an uplink transmit power control command, and wherein the at least one or more uplink carrier indicator information indicates an uplink carrier to which the uplink transmit power control command is applied; and receiving an uplink signal being transmitted from the user equipment at a transmit power, the transmit power being decided based upon the downlink control information, over the uplink carrier being decided based upon the at least one or more uplink carrier indicator information.

Also, the at least one or more uplink carrier indicator information may be included in a reserved portion, among the transmit power control command bits of the downlink control information.

Also, the at least one or more uplink carrier indicator information may be included in a reserved portion, among parity bits of the downlink control information.

Also, the at least one or more uplink carrier indicator information may be provided via higher layer signaling.

Also, the at least one or more uplink carrier indicator information may be decided based upon linkage settings between a transmit power control command index (tpc-Index) designating the uplink transmit power control command and the at least one or more uplink carrier indicator information.

Also, the linkage settings between the transmit power control command index and the at least one or more uplink carrier indicator information may either be decided by performing higher layer signaling, or may be decided in accordance with a mapping order by which the at least one or more uplink carrier indicator information is mapped to a payload.

Also, the at least one or more uplink carrier indicator information may be provided either when a downlink carrier and an uplink carrier do not configure a one-to-one mapping relation, or when a cross-carrier scheduling is performed.

In order to achieve the object of the present invention, according to yet another aspect of the present invention, a user equipment for performing uplink transmit power control in a wireless communication system supporting multiple carriers may include a reception module configured to receive a downlink signal over at least one or more downlink carriers from a base station; a transmission module configured to transmit an uplink signal over at least one or more uplink carriers to the base station; and a processor configured to control the user equipment including the reception module and the transmission module. Herein, the processor may be configured to receive downlink control information and at least one or more uplink carrier indicator information from a base station through the reception module, wherein the downlink control information includes an uplink transmit power control command, and wherein the at least one or more uplink carrier indicator information indicates an uplink carrier to which the uplink transmit power control command is applied, to decide an uplink carrier, to which the uplink transmit power control command is to be applied, based upon the at least one or more uplink carrier indicator information, to decide a transmit power respective to the decided uplink carrier based upon the downlink control information, and to transmit an uplink signal to the base station through the transmission module, based upon the decided transmit power over the decided uplink carrier.

In order to achieve the object of the present invention, according to a further aspect of the present invention, a base station for providing uplink transmit power control in a wireless communication system supporting multiple carriers may include a reception module configured to receive an uplink signal over at least one or more uplink carriers from a user equipment; a transmission module configured to transmit a downlink signal over at least one or more downlink carriers to the user equipment; and a processor configured to control the base station including the reception module and the transmission module. Herein, the processor may be configured to transmit downlink control information and at least one or more uplink carrier indicator information to a user equipment through the transmission module, wherein the downlink control information includes an uplink transmit power control command, and wherein the at least one or more uplink carrier indicator information indicates an uplink carrier to which the uplink transmit power control command is applied, and to receive an uplink signal being transmitted from the user equipment through the reception module at a transmit power, the transmit power being decided based upon the downlink control information, over the uplink carrier being decided based upon the at least one or more uplink carrier indicator information.

The above-described general and brief description of the present invention and the detailed description of the present invention that will follow are merely exemplary and respectively correspond to additional description of the appended claims of the present invention.

Effects of the Invention

According to the exemplary embodiments of the present invention, the present invention may provide a method and apparatus for controlling transmission power that enables a transmission power control command to be accurately and efficiently provided in a wireless communication system supporting multiple carriers, and that enables an uplink transmission subject to correctly and efficiently transmit a target uplink carrier at a transmission power, which is decided based upon the corresponding transmission power control command.

Additionally, in a wireless communication system supporting multiple carriers, a control overhead for providing a transmission power control command and a search process burden of a user equipment may be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

FIG. 6 illustrates a conceptual view of component carriers (CC) respective to the uplink and the downlink.

FIG. 8 illustrates a conceptual view of a DCI Format 3 according to a 3GPP LTE Release-8 system and its respective tpc-Index configuration.

FIG. 9 illustrates a conceptual view of a DCI Format 3A according to a 3GPP LTE Release-8 system and its respective tpc-Index configuration.

FIG. 11 illustrates an exemplary position of a CIF within the DCI Format 3 according to an exemplary embodiment of the present invention.

FIG. 12 illustrates an exemplary position of a CIF within the DCI Format 3A according to an exemplary embodiment of the present invention.

BEST MODE FOR CARRYING OUT THE PRESENT INVENTION

Figure 1:
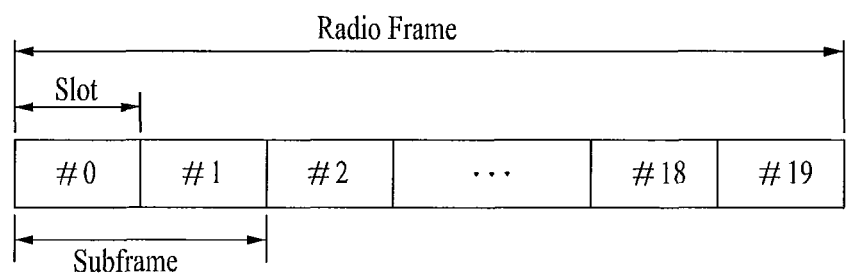
FIG. 1 illustrates an exemplary structure of a wireless frame being used in a 3GPP LTE system.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. Also, in the description of the present invention, the term base station may also be used as a term including the concept of a cell or sector. Meanwhile, the term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. Also, in the description of the present invention, the term base station may also be used as a term including the concept of a cell or sector. Meanwhile, the term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

FIG. 1 illustrates an exemplary structure of a wireless (or radio) frame being used in a 3GPP LTE system. One wireless (or radio) frame includes 10 sub-frames, and one sub-frame includes 2 slots in a time domain. The time for transmitting one sub-frame is defined as a Transmission Time Interval (TTI). For example, one sub-frame may have the length of 1 ms, and one slot may have the length of 0.5 ms. One slot may include a plurality of OFDM symbols in the time domain. Since the 3GPP LTE system uses the OFDMA method during a downlink, the OFDM symbol may indicate one symbol length (period). During an uplink, one symbol may be referred to as an SC-FDMA symbol or a symbol length. A Resource Block (RB) corresponds to a resource allocation unit, and, in a slot, the resource block (RB) includes a plurality of consecutive sub-carriers. However, the above-described wireless frame structure is merely exemplary. Therefore, the number of sub-frames included in a wireless frame, the number of slots included in one sub-frame, or the number of OFDM symbols being included in one slot may be varied in many different ways.

Figure 2:
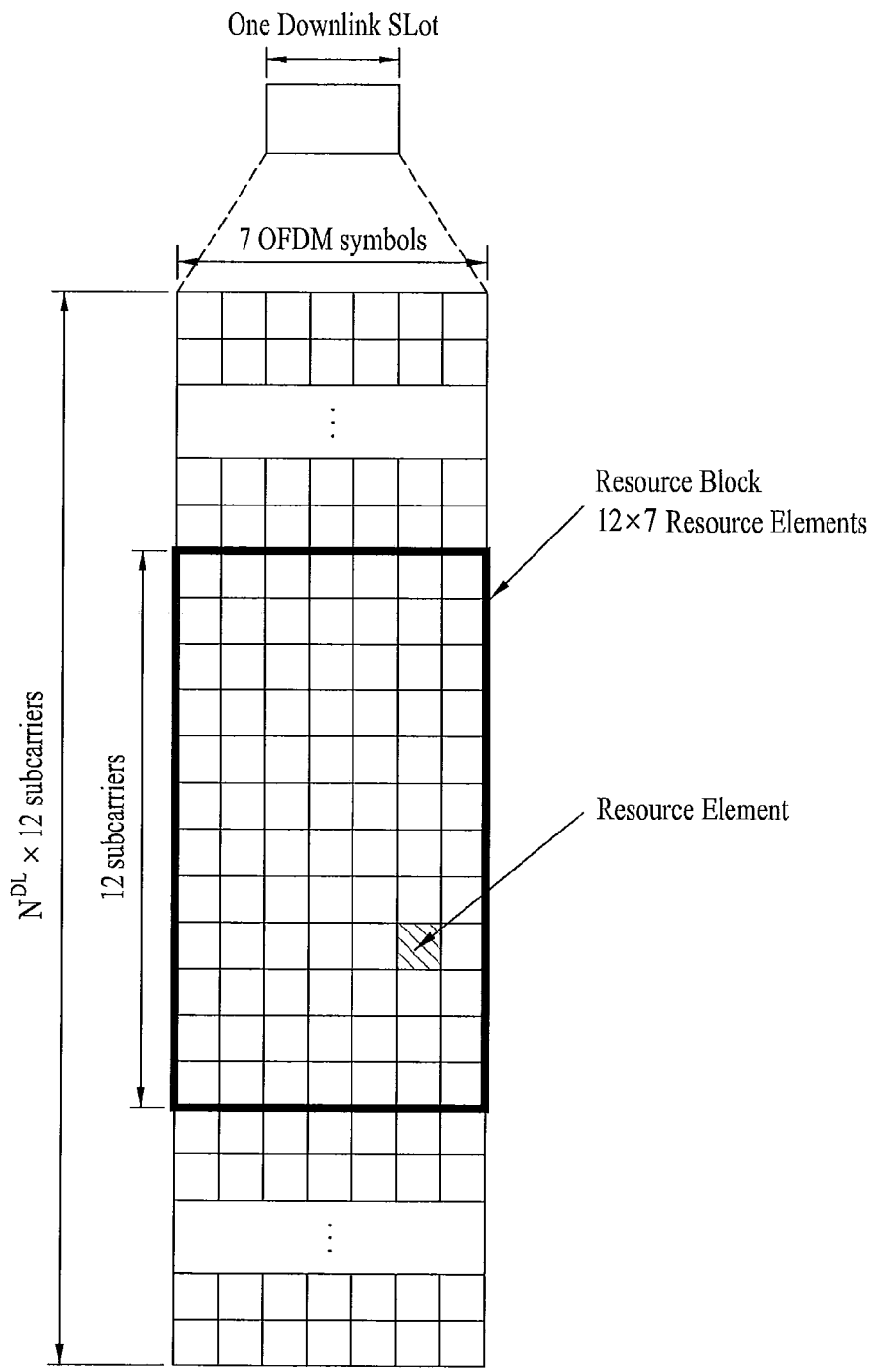
FIG. 2 illustrates a resource grid of a downlink slot.

FIG. 2 illustrates a resource grid of a downlink slot. Although it is shown in FIG. 2 that one downlink slot includes 7 OFDM symbols in a time domain, and that one resource block (RB) includes 12 sub-carriers in a frequency domain, this is merely exemplary. And, therefore, the present invention will not be limited only to the example presented in FIG. 2. For example, in case of a general Cyclic Prefix (CP), one slot includes 7 OFDM symbols. Alternatively, in case of an extended Cyclic Prefix (extended-CP), one slot may include 6 OFDM symbols. Referring to FIG. 2, each element configuring the resource grid is referred to as a resource element (RE). One resource block includes 12×7 resource elements. An $N^{DL}$ number of resource blocks included in a downlink slot may vary in accordance with a downlink transmission bandwidth. The structure of an uplink slot may be identical to the above-described structure of the downlink slot.

Figure 3:
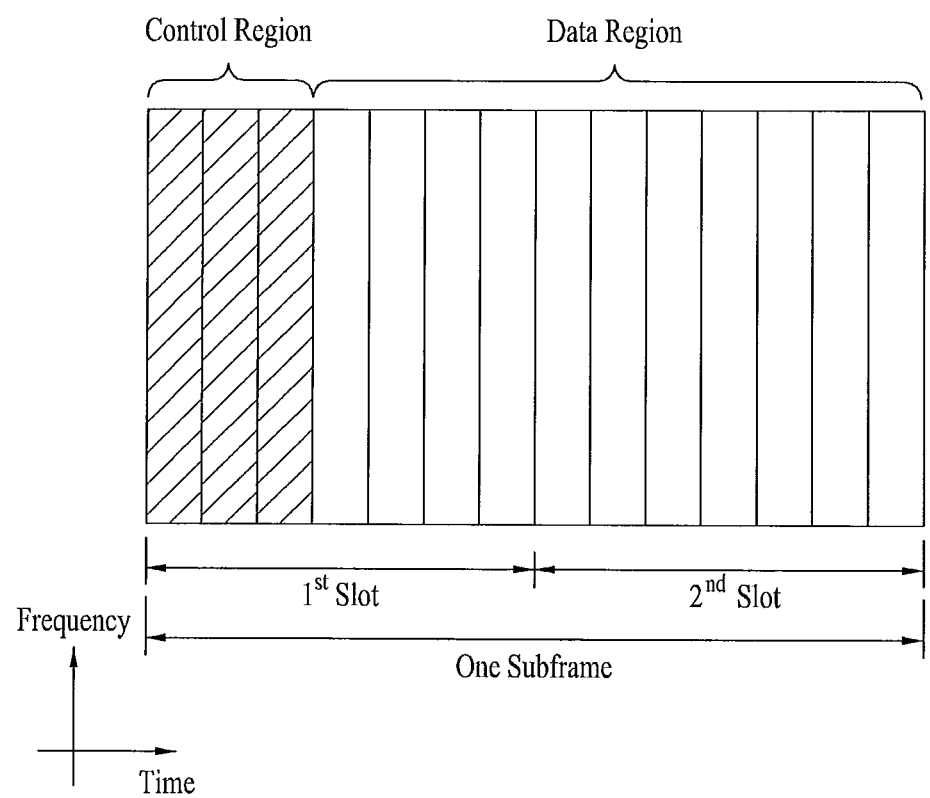
FIG. 3 illustrates an exemplary structure of a downlink sub-frame.

FIG. 3 illustrates an exemplary structure of a downlink sub-frame. A maximum of 3 OFDM symbols located at the front portion of a first slot within one sub-frame corresponds to a control region wherein a control channel is allocated (or assigned). The remaining OFDM symbols correspond to a data region wherein a Physical Downlink Shared Channel (PDSCH) is assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH includes information on the number of OFDM symbols being transmitted from the first OFDM symbol of a sub-frame and being used in the control channel transmission within the sub-frame. As a response to an uplink transmission, the PHICH includes HARQ ACK/NACK signals. The control information being transmitted through the PDCCH is referred to as Downlink Control Information (DCI). Herein, the DCI may include uplink or downlink scheduling information or may include an uplink transmission power control command on a random terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCR corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a (Cyclic Redundancy Check; CRC) to the control information. Depending upon the owner or purpose of the PDCCH, the CRC may be masked by a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to a system information (more specifically, a system information block (SIB)), a system information identifier, and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC. Furthermore, in case the PDCCH belongs to a Transmit Power Control (TPC) command respective to the uplink transmit (or transmission) power of a user equipment, a Transmit Power Control RNTI (TPC-RNTI) may be masked to the CRC. More specifically, in case the PDCCH belongs to a TPC command for a physical uplink control channel (PUCCH), a TPC-PUCCH RNTI may be masked to the CRC, and, in case the PDCCH belongs to a TPC command for a physical uplink shared channel (PUSCH), a TPC-PUSCH RNTI may be masked to the CRC.

Figure 4:
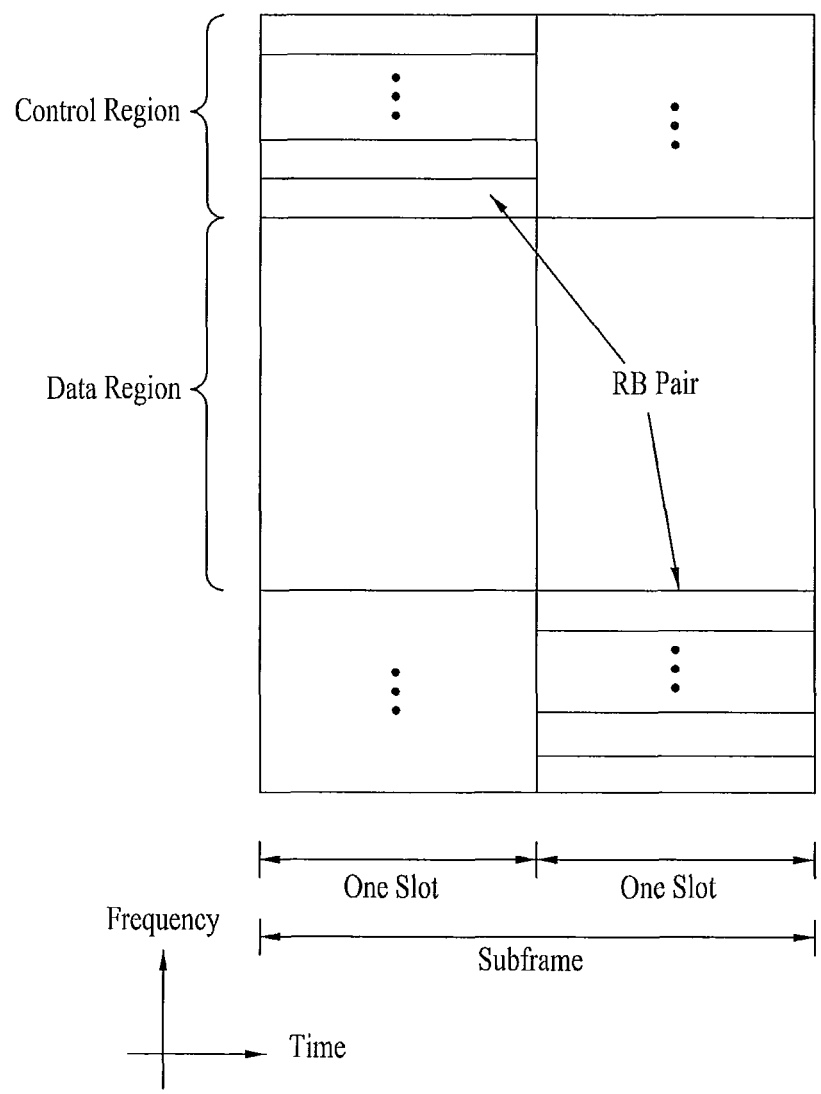
FIG. 4 illustrates an exemplary structure of an uplink sub-frame.

FIG. 4 illustrates an exemplary structure of an uplink sub-frame. In a frequency domain, an uplink sub-frame may be divided into a control region and a data region. A Physical Uplink Control Channel (PUCCH) including uplink control information is allocated to the control region. And, a Physical uplink shared channel (PUSCH) including user data is allocated to the data region. In order to maintain the characteristic of a unique (or single) carrier, one user equipment does not transmit the PUCCH and the PUSCH at the same time. The PUCCH for a user equipment is allocated to a resource block pair (RB pair) within a sub-frame. Each of the resource blocks (RBs) belonging to the RB pair occupies a different sub-carrier for 2 slots. This state may be referred to as the resource block pair, which is allocated to the PUCCH, as being "frequency-hopped" at the slot boundary.

Carrier Aggregation

In a general wireless communications system, even when the bandwidth for each of an uplink and a downlink is set up differently, only a single carrier is being taken into consideration. For example, based on the single (or unique) carrier structure, the number of carriers configuring each of the uplink and the downlink respectively corresponds to 1. And, accordingly, a wireless communications system, wherein the bandwidth of the uplink and the bandwidth of the downlink are generally symmetrical to one another, may be provided.

The ITU (International Telecommunication Union) is requesting the candidate technology of IMT-Advanced to support a more expanded bandwidth as compared to that of the conventional wireless communications system. However, with the exception for a select area throughout the world, there still exist many difficulties in allocating a large bandwidth frequency. Therefore, in order to resolve such difficulties, a carrier aggregation (also referred to as bandwidth aggregation or spectrum aggregation) technology is currently under development. The carrier aggregation technology corresponds to a technology developed for an efficient usage of small segmented bands. More specifically, a plurality of small bands is physically grouped in the frequency domain so that the group of segmented bands can be logically used as one large band.

The carrier aggregation technology is adopted so as to support an increasing throughput, to prevent an increase in the manufacturing cost caused by the addition of a broadband RF device, and to ensure backward compatibility with the conventional system. More specifically, carrier aggregation refers to a technology enabling a user equipment (or terminal) and a base station to exchange data to and from one another through multiple groups of carriers of a bandwidth unit defined by the conventional wireless communications system (e.g., the 3GPP LTE release 8 or 9 system in case of the 3GPP LTE-Advanced system). Herein, the carrier of the bandwidth unit defined by the conventional wireless communications system may be referred to as a component carrier (CC). The carrier aggregation technology using at least one or more component carriers may be applied in each of the uplink and the downlink. The carrier aggregation technology may include a technology supporting a system bandwidth of up to a maximum of 100 MHz by grouping a maximum of 5 component carriers, even when one component carrier supports the bandwidth of 5 MHz, 10 MHz or 20 MHz.

A downlink component carrier may be expressed as DL CC, and an uplink component carrier may be expressed as UL CC. Additionally, a carrier or component carrier may also be expressed as a cell in accordance with a method of describing and expressing functionality configurations in the 3GPP standard. Accordingly, DL CC may be expressed as DL cell, and UL CC may be expressed as UL cell. Hereinafter, in the description of the present invention, multiple carriers having carrier aggregation applied thereto may also be applied by using the terms carrier, component carrier, CC, or cell.

A downlink carrier aggregation may be described as the base station supporting downlink transmission to the user equipment by using a frequency domain resource (a sub-carrier or PRB (Physical Resource Block)) of at least one or more sub-carrier bands within a time domain resource (a subframe unit). An uplink carrier aggregation may be described as the user equipment supporting uplink transmission to the base station by using a frequency domain resource (a sub-carrier or PRB (Physical Resource Block)) of at least one or more sub-carrier bands within a time domain resource (a sub-frame unit).

Figure 5:
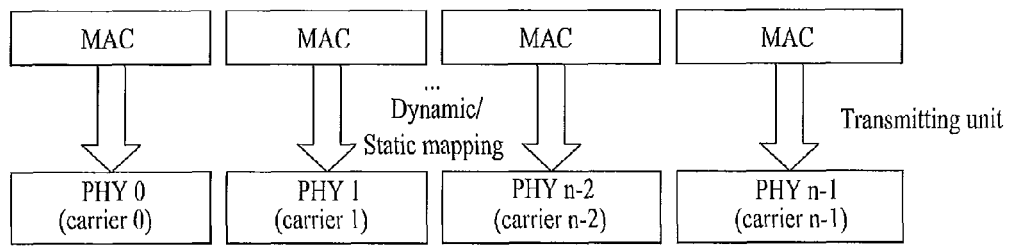
FIG. 5 illustrates exemplary structures of a physical layer (L1) and a MAC layer (L2) in a multiple carrier supporting system.
Figure 5:
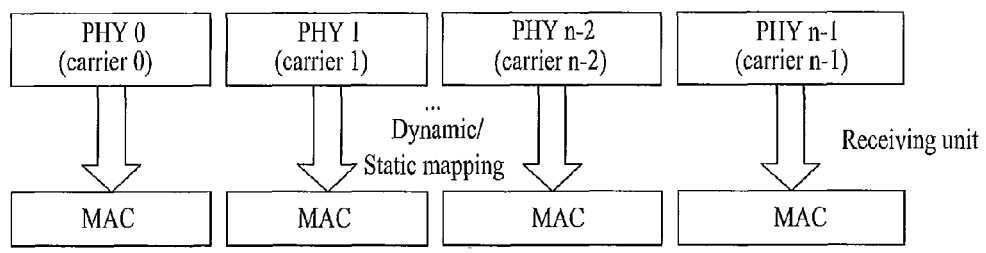
Figure 5:
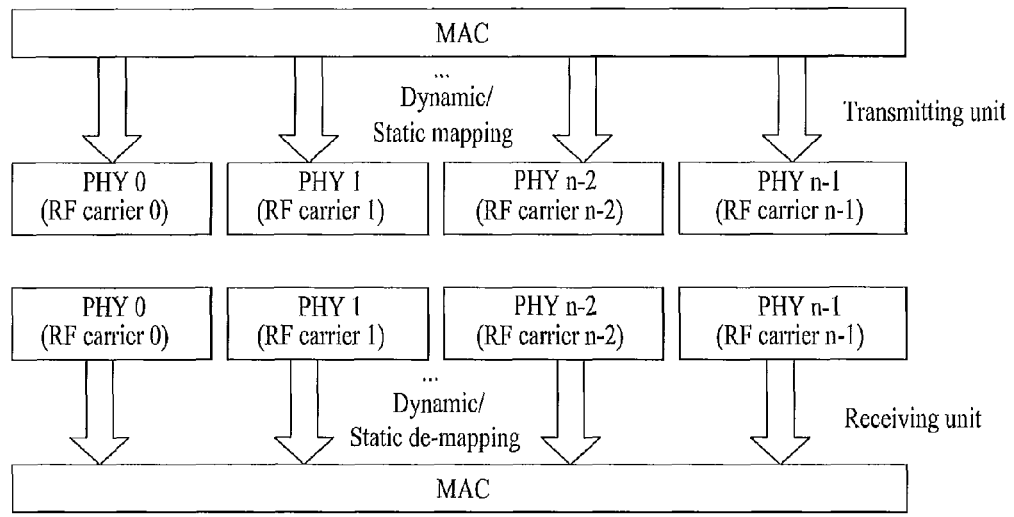

The configuration of a physical layer ($1^{st}$ layer, L1) and a MAC layer ($2^{nd}$ layer, L2) of a multi-carrier supporting system will hereinafter be described in detail with reference to FIG. 5. A base station of the conventional wireless communication system, which supports a single carrier, includes one physical layer (PHY) entity supporting one carrier, and one MAC (Medium Access Control) entity for controlling one PHY entity may also be provided in the base station. For example, in the PHY layer, a baseband processing operation may be performed. And, for example, in the MAC layer, a receiving unit may generate a MAC PDU (Protocol Data Unit) and may perform operations of an L1/L2 scheduler including MAC/RLC sub-layers. A MAC PDU packet block of the MAC layer passes through a logical transport layer so as to be converted to a transport block, thereby mapped to a physical layer input information block. The MAC layer of FIG. 5 may be expressed as the entire L2 layer so as to be applied as a layer defined to include MAC/RLC/PDCP layers. It will be apparent that such application may also be applied by replacing all description for the MAC layer within the entire description of the present invention.

Meanwhile, in a multi-carrier supporting system, a plurality of MAC-PHY entities may be provided. More specifically, as shown in FIG. 5(a), a transmitter and a receiver of the multi-carrier supporting system may be configured to have one MAC-PHY entity corresponding each of n number of component carriers. Since an independent PHY layer and an independent MAC layer are configured for each component carrier, a PDSCH may be generated for each component carrier in the physical layer from the MAC PDU.

Alternatively, a multi-carrier supporting system may also be configured by using a single common MAC entity and a plurality of PHY entities. More specifically, as shown in FIG. 5(b), a transmitter and a receiver of the multi-carrier supporting system may be configured to have n number of PHY entities respectively correspond to each of the n number of component carriers and to have one common MAC entity control the n number of PHY entities. In this case, a MAC PDU from a single MAC layer may be divided into a plurality of transport blocks each corresponding to the plurality of component carriers within the transport layer. Alternatively, when generating a MAC PDU in the MAC layer, or when generating an RLC PDU in an RLC layer, the PDU may be divided with respect to each component carrier. Accordingly, a PDSCH may be generated for each component carrier within the physical layer.

The PDCCH, which transmits control information for L1/L2 control signaling generated from a packet scheduler of the MAC layer, may be mapped to a physical resource for each separate component carrier, thereby being transmitted. Herein, the PDCCH, which includes control information (downlink allocation or uplink grant) for the PDSCH or PUSCH transmission for a specific user equipment, may be separately encoded for each component carrier to which the corresponding PDSCH/PUSCH is transmitted. Such PDCCH may be referred to as a separate coded PDCCH. Meanwhile, control information for PDSCH/PUSCH transmission of multiple component carriers may be configured as a single PDCCH so as to be transmitted. And, such PDCCH may be referred to as a joint coded PDCCH.

In order to support carrier aggregation, a connection between the base station and the user equipment is required to be set up, or a preparation for a connection set-up between the base station and the user equipment (or relay station) is required to be made, so that a control channel (PDCCH or PUCCH) and/or a shared channel (PDSCH or PUSCH) can be transmitted. In order to perform such connection/connection set-up for each specific user equipment (or relay station), a measurement and/or reporting process on the carrier is required to be performed. And, component carriers corresponding to the targets of such carrier measurement and/or reporting, may be assigned (or allocated). More specifically, component carrier assignment refers to setting up component carriers (i.e., designating number component carriers and component carrier index) that are used for uplink/downlink transmissions, among the uplink/downlink component carriers configured in the base station, while taking into consideration the capability of the specific user equipment (or relay station) and the system environment.

At this point, when a $3^{rd}$ layer (L3) RRM (Radio Resource Management) controls component carrier assignment, UE-specific or RN-specific RRC signaling may be used. Alternatively, cell-specific or cell cluster-specific RRC signaling may also be used. When a dynamic control, such as a series of component carrier activation/deactivation configurations (or settings), is required when performing component carrier allocation, a predetermined PDCCH may be used for L1/L2 control signaling, or a physical control channel dedicated to component carrier assignment control information or a PDSCH configured in an L2 MAC message format may also be used. Meanwhile, when a packet scheduler controls the component carrier assignment (or allocation), a predetermined PDCCH may be used for L1/L2 control signaling, or a physical control channel dedicated to component carrier assignment control information may be used, or a PDSCH configured in an L2 MAC message format may be used.

FIG. 6 illustrates a conceptual view of component carriers (CC) respective to the uplink and the downlink. The downlink (DL) and uplink (UL) CCs of FIG. 6 may be allocated by the base station (cell) or the relay station (or relay node). For example, the number of DL CCs may be set to N, and the number of UL CCs may be set to M.

After performing a step of setting up (or determining) an RRC connection (such as a cell search procedure, a system information acquisition/reception procedure, an initial random access procedure, and so on) based upon a single random CC respective to each of the DL and the UL through an initial access procedure or an initial deployment procedure of the user equipment, unique carrier settings specified for each user equipment may be provided from the base station through dedicated signaling (user equipment specific RRC signaling or user equipment specific L1/L2 PDCCH signaling). Alternatively, when carrier settings for each user equipment is commonly performed in base station (cell or cell-cluster) units, the carrier settings may be provided through cell-specific RRC signaling or cell-specific user equipment shared (or common) L1/L2 PDCCH signaling. Alternatively, carrier settings may be signaled to the user equipment through system information for a RRC connection set-up respective to the carrier configuration information, which is configured by the base station, or the carrier settings may be signaled to the user equipment through separate system information after the step of performing RRC connection set-up or through cell-specific RRC signaling.

Herein, the DL/UL CC linkage (or connection) may either be implicitly set-up during the process of uniquely assigning the above-described DL/UL CCs to each user equipment, or be explicitly set-up through a definition of a random signaling parameter.

Figure 7:
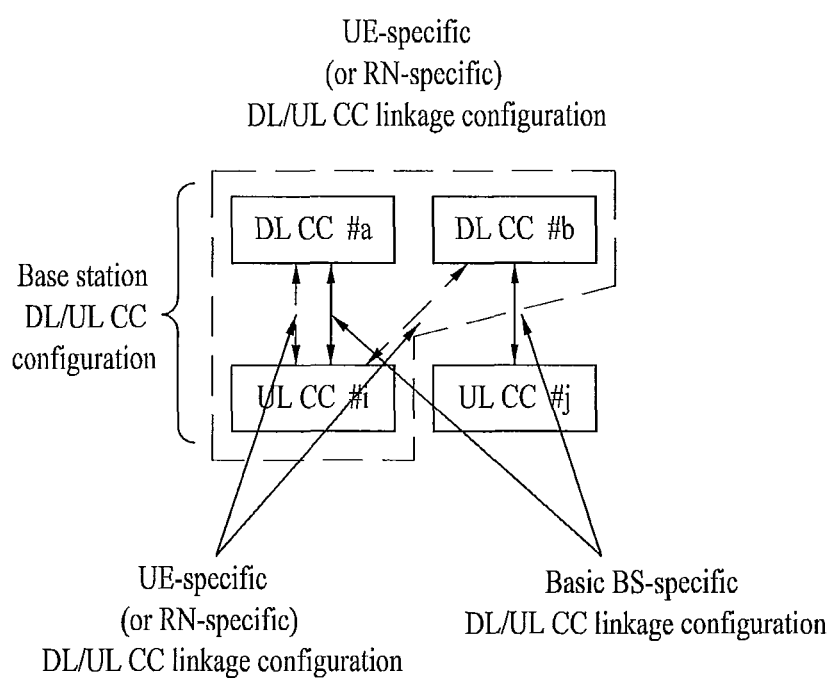
FIG. 7 illustrates an example of a DL/UL CC connection.

FIG. 7 illustrates an example of a DL/UL CC linkage (or connection). FIG. 7 illustrates an exemplary DI/UL CC linkage being defined in accordance with 2 downlink CCs (DL CC #a and DL CC #b) and 1 uplink CC (UL CC #i) being allocated to a random user equipment, when the base station configures the CC with 2 downlink CCs (DL CC #a and DL CC #b) and 2 uplink CCs (UL CC #i and UL CC #j). In the DL/UL CC linkage configuration shown in FIG. 7, the solid line represents the basic linkage settings configured between the DL CC and the UL CC by the base station, and this may be defined as SIB 2. And, in the DL/UL CC linkage configuration shown in FIG. 7, the dashed line (or dotted line) represents the linkage settings configured between the DL CC and the UL CC with respect to a specific user equipment. Herein, the linkage settings between the DL CC and the UL CC, shown in FIG. 7, are merely exemplary. And, therefore, the present invention will not be limited only to the example presented herein. More specifically, according to other diverse embodiments of the present invention, the number of DL CCs and UL CCs configured by the base station may be set-up to be assigned with a random value. And, accordingly, among the DL CCs and UL CCs, which are configured as described above, the number of DL CCs and UL CCs that are user equipment specifically determined or allocated may also be set up to be assigned with a random value. Furthermore, it will be also apparent that the respective DL/UL CC linkage may be defined by a method different from that shown in FIG. 5.

Additionally, among the DL and UL component carriers that are being configured or set up in a random user equipment for a series of specific purposes, a primary CC (PCC) (or primary cell; P-cell) or an anchor CC (or anchor cell) may be configured. For example, a DL PCC (or DL P-cell) may be configured for the purpose of always transmitting configuration/reconfiguration information over an RRC connection configuration. And, as another example, a UL PCC (or UL P-cell) may be configured as a UL CC transmitting a PUCCH for transmitting a UCI, which is required to be transmitted by a random user equipment via uplink. As a basic rule, each one of the DL-PCC (P-cell) and the UL PCC (P-cell) is specifically determined for each user equipment. Alternatively, in case an excessive number of CCs are being assigned (or set-up) to the user equipment, or in a situation where CCs may be assigned by a plurality of base stations, each one of or a plurality of the DL PCCs (P-cells) and/or UL PCCs (P-cells) may be determined for a single user equipment by one base station or a plurality of base stations. A method arbitrarily performed by a base station for UE-specifically configuring a linkage between a DL PCC (P-cell) and a UL PCC (P-cell) may first be considered. Conversely, as a more simplified method, a linkage between the DL PCC (P-cell) and the UL PCC (P-cell) may be configured based upon a basic linkage, which is pre-defined and signaled as an SIB (System Information Block (or Base)) 2 by a LTE Release-8 (Rel-8). The DL PCC (P-cell) and the UL PCC (P-cell) configuring the above-described linkage may be UE-specifically grouped as a P-cell.

Additionally, carrier aggregation may be based upon the application of cross-carrier scheduling. Herein, for example, cross-carrier scheduling refers to a case when control information (DL channel allocation PDCCH), which schedules PDSCH transmission over DL CC #b, is being transmitted over a DL CC (DL CC #a) other than DL CC #b, or refers to a case when control information (UL grant PDCCH), which schedules PUSCH transmission over UL CC #j, is being transmitted over a DL CC (DL CC #a) other than a specific DL CC (e.g., DL CC #b) that is determined to configure a linkage with UL CC #j. Conversely, a case when a DL allocation PDCCH respective to a PDSCH transmission over DL CC #b is being transmitted through DL CC #b, or a case when a UL grant PDCCH respective to a PUSCH transmission over UL CC #j is being transmitted through DI CC #b, which determined to configure a linkage with UL CC #j, may indicate a case when cross-carrier scheduling in not being performed.

Furthermore, in the description of the present invention, the description of the DL/UL CC configuration is essentially focused on the relation between the base station and the user equipment. However, the present invention will not be limited only to the exemplary description given herein. For example, with respect to a user equipment located in a relay station (or relay node) area, the description presented above may be equally applied to a case when the relay node provides the DL/UL CC configuration of the corresponding user equipment (UE). Moreover, with respect to relay node located in a base station area, the description presented above may also be equally applied to a case when the base station provides the DL/UL CC configuration of the corresponding relay node. Hereinafter, although the DL/UL CC configuration is essentially described based upon the relation between the base station and the user equipment, for clarity, it will be apparent that the same description may be equally applied to a relay node-user equipment relation (access uplink and downlink) and also applied to a base station-relay node relation (Backhaul uplink and downlink).

Uplink Transmit Power Control

In a wireless communication system, the object of Power Control is to ensure a Signal-to-Noise Ratio (SNR) required by the system by compensating for a path loss and fading of a channel and also to provide a high system capability through an appropriate rank adaptation. Furthermore, an inter-cell interference may be controlled (or adjusted) by the power control.

In the conventional system, the uplink power control is based on a closed-loop correction and also on an open-loop power control. Herein, the open-loop power control is processed by the user equipment (UE), and the closed-loop correction is performed by the base station (evolved Node B (eNB)).

An Uplink Transmit Power Control (TPC) command may be defined in a DCI format of the PDCCH and may be provided to the user equipment from the base station through the PDCCH. For example, DCI Format 3 and DCI Format 3A of the PDCCH may belong to the uplink transmit power control command, and each of the DCI Format 3 and DCI Format 3A may include a group TPC command respective to a user equipment group. If the PDCCH including DCI Format 3/3A corresponds to that of a PUCCH transmit power control, a TPC-PUCCH RNTI may be masked to (or scrambled in) a CRC parity bit of the PUCCH. And, if the PDCCH including DCI Format 3/3A corresponds to that of a PUSCH transmit power control, a TPC-PUSCH RNTI may be masked to (or scrambled in) a CRC parity bit of the PUCCH. The user equipment may perform blind decoding on the DCI Format 3/3A existing in a common search space in an uplink by using the corresponding RNTI (e.g., TPC-PUCCH-RNTI or TPC-PUSCH-RNTI), so as to acquire DCI Format 3/3A information. Thereafter, the user equipment may use a TPC-index parameter, which is provided from a higher layer (e.g., RRC layer), so as to locate the TPC command, which is being provided to the corresponding user equipment, from DCI Format 3/3A. Then, by applying the corresponding TPC command value to a power control equation, the user equipment may decide an uplink (PUCCH or PUSCH) transmit power level. This will be described later on in more detail.

The DCI Format 3 will first be described in detail.

DCI Format 3 is used for transmitting a TPC command, which is being expressed by using power adjustment values of 2 bits respective to the PUCCH and the PUSCH. Herein, TPC Command #1, TPC Command #2, . . . , TPC Command #N may be transmitted through DCI Format 3 (wherein #1, #2, . . . #N respectively indicate a TPC command index). Herein, when a payload size including all padding bits of DCI Format 0 prior to being processed with CRC attachment is defined as $L_{format0}$, $$N = \left\lfloor \frac{L_{format0}}{2} \right\rfloor$$

may be defined (wherein $\lfloor \; \rfloor$ indicates floor operation, and $\lfloor x \rfloor$ or floor(x) represents a maximum integer that does not exceed x). Also, an index of a TPC command respective to the corresponding user equipment may be defined through a parameter tpc-Index, which is provided by a higher layer. In case $$\left\lfloor \frac{L_{format0}}{2} \right\rfloor < \frac{L_{format0}}{2},$$

a bit having the value 0 may be attached to DCI Format 3.

FIG. 8 illustrates a conceptual view of a DCI Format 3 according to a 3GPP LTE Release-8 system and its respective tpc-Index configuration. DCI Format 3 may have a payload size identical to that of DCI Formats 0 and 1A. One TPC command may be configured of 2 bits, and a maximum of 15 TPC commands may configure one group. Accordingly, the number of TPC commands being included in the DCI format 3 may be decided as a maximum integer that does not exceed a value equivalent to the payload size (N) of DCI Formats 0 and 1A divided by 2 (i.e., floor(N/2)). Also, tpc-Index may be notified to the user equipment from the RRC layer as an integer value (1~15). The user equipment may decide the TPC command that corresponds to the user equipment itself through the provided tpc-Index. The parity bit for DCI Format 3 may be configured of 16 bits.

Hereinafter, the DCI Format 3A will be described in detail.

DCI Format 3A is used for transmitting a TPC command, which is being expressed by using power adjustment values of 1 bit respective to the PUCCH and the PUSCH. Herein, TPC Command #1, TPC Command #2, . . . , TPC Command #M may be transmitted through DCI Format 3A (wherein #1, #2, #M respectively indicate a TPC command index). Herein, when a payload size including all padding bits of DCI Format 0 prior to being processed with CRC attachment is defined as $L_{format0}$, $M = L_{format0}$ may be defined. Also, an index of a TPC command respective to the corresponding user equipment may be defined through a parameter tpc-Index, which is provided by a higher layer.

FIG. 9 illustrates a conceptual view of a DCI Format 3A according to a 3GPP LTE Release-8 system and its respective tpc-Index configuration. Referring to FIG. 9, DCI Format 3A may have a payload size identical to that of DCI Formats 0, 1A, and 3. More specifically, each of DCI Formats 0, 1A, 3, and 3A may have the same size. One TPC command may be configured of 1 bit, and a maximum of 31 TPC commands may configure one group. Accordingly, the number of TPC commands being included in the DCI format 3A may be decided as a value equivalent to the payload size (M) of DCI Formats 0 and 1A. Also, tpc-Index may be notified to the user equipment from the RRC layer as an integer value (1~31). The user equipment may decide the TPC command that corresponds to the user equipment itself through the provided tpc-Index. The parity bit for DCI Format 3A may be configured of 16 bits.

Figure 10:
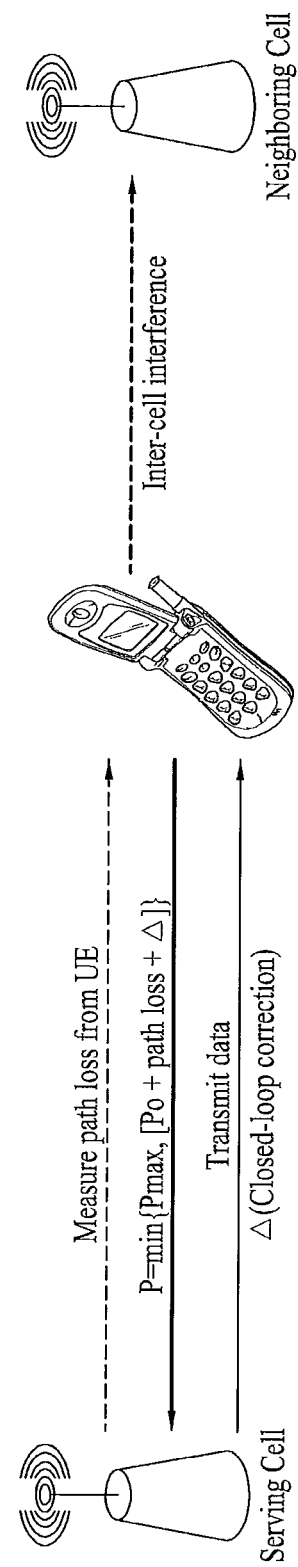
FIG. 10 illustrates a basic concept of an uplink power control.

FIG. 10 illustrates a basic concept of an uplink power control.

Referring to FIG. 10, the uplink power is generally measured by a user equipment by using a closed loop method. And, the base station may adjust the uplink power by using a closed loop correction factor $\Delta$. The power of the uplink shared channel (PUSCH) may be obtained by using Equation 1 shown below.

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} \quad \text{Equation 1}$$

In Equation 1, one unit of $P_{PUSCH}(i)$ may be expressed as dBm. In Equation 1, i indicates a time index (or a subframe index), $P_{CMAX}$ indicates a maximum tolerance power, and the maximum tolerance power follows the class of a user equipment. Also, $M_{PUSCH}(i)$ may be decided in accordance with the allocated resource block, may have a value ranging from 1 to 110, and may be updated for each subframe. $\alpha(j) \cdot PL$ corresponds to a formula for performing path loss compensation. Herein, PL represents a downlink path loss, which is measured by the user equipment, and $\alpha$ represents a scaling value, which may be expressed as a value equal to or less than 1 and as a value of 3 bits. If $\alpha$ is equal to 1, this indicates that the path loss has been completely compensated, and if $\alpha$ is less than 1, this indicates that only a portion of the path loss has been compensated.

$P_{O\_PUSCH}(j)$ may be calculated by using Equation 2 shown below.

$$P_{O\;PUSCH}(j) = P_{O\_NOMINAL\_PUSCH}(j) + P_{O\_UE\_PUSCH}(j) \quad \text{Equation 2}$$

$P_{O\_NOMINAL\_PUSCH(j)}$ is cell-specifically provided by a higher layer, and $P_{O\_UE\_SPECIFIC}(j)$ is user equipment specifically given by the higher layer.

In Equation 1, f(i) corresponds to a user equipment-specific parameter that can be controlled by the base station. Herein, the f(i) may be calculated by using Equation 3 shown below.

$$f(i) = f(i-1) + \delta_{PUSCH}(i - K_{PUSCH}) \quad \text{Equation 3}$$

In Equation 3, $\delta_{PUSCH}$ corresponds to a user equipment specific correction value and may also be referred to as a transmit power control (TPC) command. $\delta_{PUSCH}$ may be included in the PDCCH of DCI Format 0 or may be joint-coded to the PDCCH of DCI Formats 3/3A along with other TPC commands.

A $\delta_{PUSCH}$ dB accumulated value being signaled over the PDCCH of DCI Format 0, is given as shown in Table 1 below.

Additionally, a $\delta_{PUSCH}$ dB accumulated value being signaled over the PDCCH of DCI Format 3, is also given as shown in Table 1 below.

TABLE 1

| TPC Command Field in DCI format 0/3 | Accumulated $\delta_{PUSCH}$ [dB] | Absolute $\delta_{PUSCH}$ [dB] only DCI format 0 |
|---|---|---|
| 0 | −1 | −4 |
| 1 | 0 | −1 |
| 2 | 1 | 1 |
| 3 | 3 | 4 |

Meanwhile, the power control for the uplink control channel (PUCCH) may be defined by using Equation 4 shown below.

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$ Equation 4

In Equation 4, one unit of $P_{PUCCH}(i)$ may be expressed as dBm. In Equation 4, $\Delta_{F\_PUCCH}(F)$ is provided by a higher layer, and each $\Delta_{F\_PUCCH}(F)$ value corresponds to a PUCCH format (F), which is related to PUCCH format 1a.

$h(n_{CQI}, n_{HARQ})$ corresponds to a value subordinate to the PUCCH format. Herein, $n_{CQI}$ corresponds to a number information bit for the Channel Quality Information (CQI), and $n_{HARQ}$ corresponds to a number of HARQ (Hybrid Automatic Repeat request) bits.

With respect to PUCCH formats 1, 1a, 1b, Equation 5 shown below is satisfied.

$$h(n_{CQI}, n_{HARQ}) = 0$$ Equation 5

Additionally, with respect to PUCCH formats 2, 2a, 2b and a normal Cyclic Prefix, Equation 6 shown below is satisfied.

$$h(n_{CQI}, n_{HARQ}) = \begin{cases} 10 \log_{10}\left(\frac{n_{CQI}}{4}\right) & \text{if } n_{CQI} \geq 4 \\ 0 & \text{otherwise} \end{cases}$$ Equation 6

Furthermore, with respect to PUCCH format 2 and an extended Cyclic Prefix, Equation 7 shown below is satisfied.

$$h(n_{CQI}, n_{HARQ}) = \begin{cases} 10 \log_{10}\left(\frac{n_{CQI} + n_{HARQ}}{4}\right) & \text{if } n_{CQI} + n_{HARQ} \geq 4 \\ 0 & \text{otherwise} \end{cases}$$ Equation 7

Meanwhile, $P_{\_O\_PUCCH}(j)$ corresponds to a parameter, which is configured of a sum of $P_{O\_NOMINAL\_PUCCH}(j)$ and $P_{O\_NOMINAL\_SPECIFIC}(j)$. And, $P_{O\_NOMINAL\_PUSCH}(j)$ is cell-specifically provided by a higher layer, and $P_{O\_UE\_SPECIFIC}(j)$ is user equipment specifically given by the higher layer.

In Equation 4, g(i) indicates a current PUCCH power control adjustment state, which can be calculated by using Equation 8 shown below.

$$g(i) = g(i-1) + \sum_{m=0}^{M-1} \delta_{PUCCH}(i - k_m)$$ Equation 8

In Equation 8, $\delta_{PUCCH}$ corresponds to a user equipment specific correction value and may also be referred to as a Transmit Power Control (TPC) command. $\delta_{PUCCH}$ may be included in the PDCCH along with the DCI Format. Alternatively, $\delta_{PUCCH}$ may be coded along with a user equipment specific PUCCH correction value, so as to be transmitted over the PDCCH along with DCI Formats 3/3A. A CRC parity bit of the DCI Formats 3/3A is scrambled with a TPC-PUCCH-RNTI (Radio Network Temporary Identifier).

Meanwhile, by being added to the PUCCH and the PUSCH, a Sounding Reference Signal (SRS) controls power by using Equation 9 shown below.

$$P_{SRS}(i) = \min\{P_{CMAX}, P_{SRS\_OFFSET} + 10 \log_{10}(M_{SRS}) + P_{O\_PUSCH}(j) + \alpha(j) \cdot PL + f(i)\}$$ Equation 9

In Equation 9, one unit of $P_{SRS}(i)$ may be expressed as dBm. Herein, i indicates a time index (or a subframe index), $P_{CMAX}$ indicates a maximum tolerance power, and the maximum tolerance power follows the class of a user equipment. $P_{SRS\_OFFSET}$ corresponds to a user equipment specific parameter having the size of 4 bits, which is semi-statically set-up by a higher layer. $M_{SRS}$ corresponds to a bandwidth for an SRS transmission in subframe i, which is expressed by a number of resource blocks. f(i) indicates a function of a current power control adjustment for the PUSCH. $P_{\_O\_PUCCH}(j)$ corresponds to a parameter, which is configured of a sum of $P_{O\_NOMINAL\_PUCCH}(j)$ and $P_{O\_NOMINAL\_SPECIFIC}(j)$. And, $P_{O\_NOMINAL\_PUSCH}(j)$ is cell-specifically provided by a higher layer, and $P_{O\_UE\_SPECIFIC}(j)$ is user equipment specifically given by the higher layer. Herein, a value of 1 may be given as the value j respective to the PUSCH transmission (or retransmission) corresponding to a dynamically scheduled uplink grant. $\alpha(j) \cdot PL$ corresponds to a formula for performing path loss compensation. Herein, PL represents a downlink path loss, which is measured by the user equipment, and α represents a scaling value, which may be expressed as a value equal to or less than 1 and as a value of 3 bits. If α is equal to 1, this indicates that the path loss has been completely compensated, and if a is less than 1, this indicates that only a portion of the path loss has been compensated. When j is equal to 1, $\alpha \in \{0, 0.4, 0.5, 0.6, 0.7, 0.8, 0.9, 1\}$ corresponds to a 3-bit cell-specific parameter, which is provided by a higher layer. And, as a downlink path loss measurement value, the value PL may be calculated by the user equipment, and its unit may be expressed as dB.

For more description of the uplink transmit power control in addition to the above-described details, reference may be made to a standard document (e.g., 3GPP TS36.213), and for clarity of the description, detailed description of the same will be omitted. However, it will be apparent that the contents, which are disclosed in the standard document for the description of the uplink transmit power control, may be applied to the uplink transmit power control that is being used in the diverse exemplary embodiments of the present invention.

Since the above-described uplink transmit power control method is based upon a wireless communication system supporting only a single carrier in an uplink communication, a wireless communication supporting multiple carriers in an uplink cannot directly use the conventional transmit power control command without any modification. For example, if the conventional transmit power control command is directly applied without any modification, a problem may occur in that the system cannot indicate to which specific uplink carrier the transmit power control command corresponds. Therefore, an uplink transmit power control method for a user equipment or system that can be extended from a single carrier operation to a multiple carrier operation should be supported. Also, in a wireless communication system supporting multiple carriers, there may occur a case when a downlink carrier and an uplink carrier do not form a one-to-one mapping relation. For example, in some cases, the number of downlink carriers respective to a particular user equipment may be set-up to be greater than the number of uplink carriers (i.e., a DL-heavy situation). And, conversely, in some cases, the number of uplink carriers respective to a particular user equipment may be set-up to be greater than the number of downlink carriers (i.e., a UL-heavy situation). When considering the above-described characteristics of the multiple carrier system, the transmit power control method should be prepared and provided based upon a mapping relation of a TPC command respective to an uplink carrier, to which the positions of DCI formats 3/3A and the transmit power control are to be applied, the set-up of a control overhead and a common search space, a support for a case when a search burden and a cross-carrier scheduling of a user equipment is being applied, a support for a user equipment that operates in accordance with the conventional system (e.g., a system according to a 3GPP LTE release-8 standard) (i.e., a legacy support), and maintaining at the most the format of the transmit power control command, which is defined in the conventional system, and so on.

In the following description of the present invention, the base station (or cell) will be mainly given as an example of the downlink transmission subject, and a user equipment will be mainly given as an example of the uplink transmission subject. However, the present invention will not be limited only to the examples given herein. More specifically, it will be apparent that the description of the present invention may also be applied to cases when the relay station (or relay node) operates as a downlink (access downlink) transmission subject to the user equipment or as an uplink (access uplink) reception subject from the user equipment, or when the relay station operates as an uplink (Backhaul uplink) transmission subject to the base station or as a downlink (Backhaul downlink) reception subject from the base station. In other words, in the following description of the present invention, although the downlink reception subject and the uplink transmission subject may be collectively referred to as a 'user equipment', this term may be interpreted as a term including a relay station operating as a downlink reception subject from the base station and an uplink transmission subject to the base station. Furthermore, although the downlink transmission subject and the uplink reception subject may be collectively referred to as a 'base station', this term may be interpreted as a term including a relay station operating as a downlink transmission subject to the user equipment and an uplink reception subject from the user equipment.

Operation Mode 1

When the DCI formats 3/3A are created for each UL carrier and transmitted through the PDCCH, information on the corresponding UL carrier should be provided, so that the user equipment can apply the TPC command, which is being notified in a DCI format. This operation mode corresponds to a method using a portion of a bit field of the conventional DCI Format 3/3A as a Carrier Indication (or Index) Field (CIF).

As shown in FIG. 8, in case of using the conventional DCI format 3, since a maximum of 15 2-bit TPC commands may be included in a group unit, the TPC command may be created with a total of 2×15=30 bits.

According to the present invention, the CIF may be configured without any modification in the conventional DCI format. In short, a reserved room may be ensured and used for the CIF in a portion of the DCI format 3/3A. In the entire description of the present invention, since the DCI formats 3/3A including the CIF have the same configuration as the conventional DCI formats 3/3A, with the exception for the case when each of the DCI formats 3/3A is differentiated and referred to by different terms, the DCI formats 3/3A including the CIF and the conventional DCI formats 3/3A will be collectively referred to as DCI formats 3/3A.

The location being reserved for the CIF over the DCI formats 3/3A payload may correspond to a random location of a TPC command field. For example, when the size of the payload for DCI format 3 is set up to include 15 TPC commands, the reserved room for the CIF may be ensured starting from the front portion (i.e., TPC command 1 portion) of the conventional TPC command field or the end portion (i.e., TPC command 15 portion) of the conventional TPC command field, as shown in FIG. 8. However, in order to allow the user equipment supporting multiple carriers (e.g., LTE-A user equipment) to immediately know (be informed of) the CIF position (or location) without any additional signaling, it is preferable for settings to be made in advance so that a CIF is always located in a predetermined location (e.g., the very front portion of the TPC command field, the very end portion of the TPC command field (i.e., immediately in front of (or before) the CRC field), or a predetermined fixed location, and to apply a method of having the base station and the user equipment share the corresponding location.

The reserved room for the CIF may sequentially ensure a room for the CIF starting from the front portion or the end portion of the TPC command field in accordance with the maximum total number of UL carriers that can be used. For example, when a power control command for a maximum of 4 UL carriers is being provided, only one TPC command field having the size of 2 bits may be ensured as the reserved room for the CIF. And, when a power control command for a maximum of 16 UL carriers is being provided, only 2 (two) TPC command fields each having the size of 2 bits (i.e., a total of 4 bits) may be ensured as the reserved room for the CIF. As described above, a total number of bits (i.e., bit width) being used for a carrier indicator (CI) may be system-specifically defined, and a bit width for a carrier indicator (CI) in a particular carrier may be UE-specifically or carrier-specifically determined differently from the CI bit width of another carrier.

FIG. 11 illustrates an exemplary case, in the DCI format 3, when the CIF is located at the very end portion (i.e., immediately before the CRC field) of the TPC command field. However, as described above, the position of the CIF is only required to correspond to a predetermined position (or location) within the DCI format 3. Therefore, the position of the CIF proposed in the present invention will not be limited only to the very end portion of the TPC command field. Since the DCI format 3 corresponds to a 2-bit power adjustment method, when only the last TPC command field is used for the CIF, up to 4 UL carriers may be indicated by using 2 bits. When the number of UL carriers that should be indicated exceeds 4 UL carriers, the last 2 TPC command fields may be used for the CIF. And, at this point, 16 UL carriers may be indicated. When configuring the CIF by using the above-described method, the DCI format 3 for multiple carriers may be applied without influencing the user equipment, which operates in accordance with the conventional system (i.e., the legacy user equipment).

FIG. 12 illustrates an exemplary case, in the DCI format 3A, when the CIF is located at the very end portion (i.e., immediately before the CRC field) of the TPC command field. However, as described above, the position of the CIF is only required to correspond to a predetermined position (or location) within the DCI format 3A. Therefore, the position of the CIF proposed in the present invention will not be limited only to the very end portion of the TPC command field. Since the DCI format 3A corresponds to a 1-bit power adjustment method, when only the last TPC command field is used for the CIF, up to 2 UL carriers may be indicated by using 1 bit. When the number of UL carriers that should be indicated exceeds 2 UL carriers, the last 2 TPC command fields may be used for the CIF. And, at this point, 4 UL carriers may be indicated. Depending upon the number of UL carriers that are to be indicated, an adequate number of TPC command fields may be used for the CIF. When configuring the CIF by using the above-described method, the DCI format 3A for multiple carriers may be applied without influencing the legacy user equipment.

When the CIF is configured in the DCI format 3/3A, as described above, the user equipment may perform blind-decoding on the PDCCH by using an identifier (TPC-PUCCH-RNTI or TPC-PUSCH-RNTI) within a common search space, so as to acquire information on the corresponding DCI format 3/3A. By using the CIF, which exists in a predetermined position of the acquired DCI format 3/3A format, the user equipment may decide which UL carrier the TPC command is respective to, among the at least one or more UL carriers that are determined for the corresponding user equipment. Also, by using the tpc-Index that is provided by a higher layer, the user equipment may find the TPC command that is designated to the corresponding user equipment. Then, by applying the value provided from the corresponding TPC command to the power control equation (the above-described Equation 1, Equation 4, and so on), the user equipment may decide the transmit power level. The transmit power level, which is decided by using the above-described method, may be decided as the transmit power level of the UL carrier, which is decided among the at least one or more UL carriers that are determined for the corresponding user equipment.

The above-described transmit power control method in the multiple carrier system may also be applied to a case when the DL carrier and the UL carrier are not in a one-to-one mapping relation. When an asymmetry occurs in the mapping relation between the UL carrier and the DL carrier, this case will not be limited only to a case when the DL/UL carriers are system-specifically and asymmetrically determined. In other words, such case may also include a case when the DL/UL carrier asymmetry occurs in a UE-specific DL/UL carrier configuration. Also, even if the DL carrier and the UL carrier are in a one-to-one mapping relation, the above-described method, which is proposed in the present invention, may also be applied in a case when a portion of the DL carrier or a portion of the UL carrier is in an activation/de-activation state.

Additionally, when different operations are required for each carrier, as in a heterogeneous network (herein, a heterogeneous network refers to a network using different RAT (Radio Access Technology) and also a case when the network has different functions even when using the same RAT (e.g., a network wherein a macro base station and a micro base station co-exists)), there occurs a case when the power of a specific UL carrier is required to be adjusted (or controlled) by using cross-carrier scheduling. In this case, in order to effectively reduce interference within the multiple carrier system, as compared to the DL/UL asymmetry within the carrier itself, the above-described method, which is proposed in the present invention, may be applied in order to indicate which UL carrier the transmit power control command corresponds to.

With respect to the case of configuring the CIF within the DCI format 3/3A, as described above, the influence on the operations of the legacy user equipment will hereinafter be described in detail.

The DCI format 3/3A, which is transmitted to the DL carrier, is scrambled to a single RNTI (TPC-PUSCH-RNTI/TPC-PUCCH-RNTI) and exists within a common search space of the DL carrier. The user equipment may blind-decode the common search space of the DL carrier by using a predetermined RNIT, which is allocated to the corresponding user equipment in advance, so as to acquire the DCI format 3/3A. Also, the tpc-Index, which is provided by a higher layer, may be decided among indexes that do not indicate the CIF, which exists within the DCI format 3/3A. For example, when the size of a payload respective to the DCI format 3 is configured to include a total of 15 TPC commands, in case of DCI format 3, when the last TPC command field is used as the CIF, the tpc-Index may be decided as any one of 1 to 14.

Herein, it may be assumed that the DL carrier through which the DCI format 3/3A is transmitted corresponds to a DL carrier that is commonly used by a user equipment operating in accordance with the conventional system (e.g., LTE release-8 system) (i.e., the legacy system) and a user equipment operating in accordance with a new system supporting multiple carriers (i.e., LTE-A system). Such DL carrier may correspond to a DL primary CC (or primary cell) that may be UE-specifically or cell-specifically configured. Basically, a UL carrier to which a TPC command through the DCI format 3/3A is applied may be defined as a UL carrier, which is configured to have a linkage within a DL carrier, through which the DCI format 3/3A is transmitted. When the DCI format 3/3A is transmitted through the DL primary carrier (or CC), the corresponding TPC command may be applied to the UL carrier, which is configured to configure a linkage with the DL primary carrier, i.e., a UL carrier, which is defined through SIB (system information block)-2. And, at this point, the corresponding UL carrier may be designated as a UL primary carrier (primary CC or primary cell). Herein, the DL primary carrier and the UL primary carrier may be collectively referred to as a primary cell.

In this case, even if a CIF exists in the DCI format 3/3A, the legacy user equipment may apply a TPC command, which is indicated by a tpc-Index provided from a higher layer, to one of its own UL carriers by using the same method as that of the conventional method. A user equipment supporting the multiple carrier operations may decide to which UL carrier the TPC command corresponds by using the CIF existing in the DCI format 3/3A, and the corresponding user equipment may apply the TPC command, which is indicated by the tpc-Index that is provided from a higher layer, to the decided UL carrier. More specifically, in case of the legacy user equipment and in case of a user equipment supporting multiple carriers, the UL carrier, to which the TPC command is being provided through the DCI format 3/3A, may either be identically configured or be differently decided depending upon the CIF value. As described above, since the method proposed in the present invention may be applied without influencing the operations of the legacy user equipment, the transmit power control method proposed in the present invention may be commonly applied to both the legacy user equipment and the user equipment according to the multiple carrier supporting system.

Meanwhile, the TPC command may also be applied in carrier group units. In order to control the transmit power of the UL carrier group (the entire UL carrier or a portion of the UL carrier being allocated to the user equipment), the base station may provide one DCI format 3/3A respective to one UL carrier group to the user equipment. For example, it may be assumed that 2 UL carriers (UL CC #1 and UL CC #2) exist, and that each of the 2 UL carriers is controlled by a different TPC command. In this case, the base station may provide 2 different DCI format 3/3As to the user equipment through a single DL carrier or 2 different DL carriers, respectively. At this point, a CIF of the corresponding carrier may be included in the DCI format 3/3A for one of the UL carriers (UL CC #1 or UL CC #2), so that the user equipment can apply a TPC command with respect to a designated UL carrier (UL CC #1 or UL CC #2) through the CIF. In another example, it may be assumed that 3 UL carriers (UL CC #1, UL CC #2, and UL CC #3) exist, and that 2 of the UL carriers is required to be controlled by one TPC command for having the same characteristic or for a specific purpose, and that the remaining UL carrier (UL CC #3) is controlled by another TPC command. In this case, the base station may provide 2 different DCI format 3/3As, instead of 3 different DCI format 3/3As, to the user equipment through a single DL carrier or 2 different DL carriers, respectively. At this point, a CIF may be included in the DCI format 3/3A for one of the UL carriers (UL CC #3), so that the user equipment can apply a TPC command with respect to a designated UL carrier (UL CC #3) through the CIF. Conversely, settings may be made so that a CIF does not exist in the DCI format 3/3A for the 2 UL carriers (UL CC #1 and UL CC #2), or it may be indicated that the CIF does not exist. Accordingly, the user equipment may commonly apply the TPC command, which is provided through the DCI format 3/3A in which the CIF does not exist, to the remaining carriers (UL CC #1 and UL CC #2), excluding the UL carrier (UL CC #3) to which the TPC command being provided through the DCI format 3/3A is applied. For example, when power control is performed through a single power control command respective to multiple UL carriers, the corresponding UL carrier configuration is delivered in advance to the user equipment through a higher layer (i.e., RRC) control signaling, and a random UL carrier group ID may be configured to be transmitted over the DCI format 3 or 3A instead of the CIF. In another example, when configuring a power control command through the above-described higher layer control signaling, a configuration on the transmission time point (e.g., transmission order, absolute subframe, or radio frame index configuration pattern) may also be included, and a method for performing multiplexing by using only the information on the tpc-index may be applied to the DCI format 3 or 3A.

The above-described application on the TPC command for each carrier group may be applied in a situation where the differentiation of the carrier can be performed in two ways, and a different method may be applied in a case when multiple carrier groups exist. For example, among the multiple UL carrier groups, an identifier indicating a specific UL carrier group to which the TPC command is to be applied may be provided. As a basic rule, a process for applying the TPC command respective to a UL carrier group may be shared in advance by the base station and the user equipment. Meanwhile, when applying a TPC command for all of the UL carriers (or all activated UL carriers) allocated to a user equipment, when the base station transmits one RNTI, one DCI format 3/3A, and one tpc-Index, the user equipment may apply the same TPC command for all UL carriers (or all activated UL carriers) allocated to the corresponding user equipment. As described above, when the same TPC command is applied to all UL carriers, the CIF within the DCI format 3/3A may not be defined, or a pre-decided value indicating that the CIF does not exist or a random value may be transmitted instead of the CIF.

Meanwhile, another method for controlling transmit power of multiple UL carriers through a single TPC command will hereinafter be described in detail. In order to do so, a plurality of CIFs is required to be defined in a single DCI format 3/3A. For example, a CIF, which is defined by an adequate bit width in accordance with a number of UL carriers, which are required to have a transmit power control applied thereto, may be defined in at least one or more positions within the DCI format 3/3A. As one TPC command is being provided for the transmit power control of multiple UL carriers, TPC indexes that are related to a specific CIF value within a single TPC command may be interpreted as the TPC command respective to the corresponding carrier. In order to do so, a correlation may be determined between the TPC index and the CIF. Such correlation may be notified to the user equipment through a separate signaling process, and the corresponding correlation may also be shared without any separate signaling process in accordance with a pre-decided rule between the base station and the user equipment (e.g., a UL carrier index order being configured for a specific user equipment or a UL carrier index order being configured for a base station). Accordingly, the user equipment may decide a TPC command being indicated to the corresponding user equipment, among the multiple TPC commands within the DCI format 3/3A, through a TPC index, which is provided from a higher layer. And, the user equipment may also decide a UL carrier, to which the decided TPC command is to be applied, through a CIF field, which is configured to form a correlation with the TPC index. For example, it may be assumed that TPC index 1 is configured to form a correlation with CIF 1 and CIF 2. At this point, the user equipment, which receives TPC index 1 from a higher layer, may apply the TPC command being indicated by TPC index 1 to the UL carriers, which are indicated by CIF 1 and CIF 2.

As described above, even if multiple CIFs are defined in the DCI format 3/3A, the legacy user equipment may still identically interpret the TPC command as the legacy operation mode, and the user equipment supporting multiple-carrier operation may interpret the TPC command by differentiating the UL carrier in accordance with the related CIF value based upon the position of the TPC index. Accordingly, while a cross-carrier scheduling can be easily supported by using a minimum overhead within respect to a combination of deployed user equipment or a combination of user equipments monitoring different DL carriers, a transmit power control method that does not influence the operations of the legacy system may also be provided.

In the above-described methods of the present invention, the TPC index that is used by the user equipment supporting multiple carrier operations may be given the same position for each carrier, or a difference TPC index may be given for each carrier. Since the process of providing a difference TPC index for each carrier can be easily configured by using an RRC command, i.e., RRC control signaling (or higher layer control signaling), a scheduling restriction is not required to be configured in order to allocate the same index to multiple carriers. In this case, the user equipment supporting multiple carrier operations may first determine the CIF value and then decide to which UL carrier the TPC command corresponds. Thereafter, the corresponding user equipment may be operated to decide the TPC index given for the decided UL carrier.

Also, although the TPC indexes corresponding to the TPC command field, which is used as the CIF, may be defined as a predetermined fixed position without receiving any separate signaling from the base station, this may act as a restriction in the aspect of scheduling. In order to overcome such restrictions, just as the RRC signaling, the base station may be configured to interpret a TPC index or a combination of one or more TPC indexes as a carrier indicator (CI) by using system information, so that the user equipment supporting the multiple carrier operations can recognize the TPC index. At this point, by using a method of notifying the combination or location of the TPC indexes, or by using a method of notifying the starting position of a TPC index and a number of bits that are to be used as the CI, the base station may notify which TPC index is to be interpreted as the CI to the user equipment. Even when multiple CIs are included, information on the combination or location of the TPC indexes indicating the multiple CIs may be directly indicated, or may be indirectly indicated by using the starting position and bit length.

Additionally, when a user equipment supporting multiple carrier operations interprets a TPC command, the user equipment may be configured to decide whether or not the interpretation is performed while including the CIF. In other words, in deciding the TPC index existing in a TPC command, when the user equipment received the TPC command, an indication signaling respective to whether the interpretation is to be performed provided that the CI exists, or the interpretation is to be performed provided that the CI does not exist in accordance with the conventional legacy mode (single carrier operation) may be defined. Such indication signaling may be realized through a higher layer (i.e., RRC) control signaling, or an indication signaling field may be defined in a DCI format 3/3A payload in accordance with a tpc index field size (1 bit or 2 bits). Alternatively, when the user equipment interprets the TPC command, in situation where the legacy mode and the multiple carrier mode can be automatically differentiated, any one of the legacy mode and the multiple carrier mode may be selected and operated without any indication signaling. For example, while the user equipment uses the multiple carrier mode, it may be considered to operate the user equipment in the legacy mode (i.e., it may be interpreted that the CI is not included in the TPC command).

Furthermore, just as a PDCCH monitoring set, when a set of carriers that is to be particularly monitored by the user equipment is identical to the set of carriers through which the user equipment actually receives the PDSCH or identical to the set of carriers configured to the user equipment, a carrier indicator may not be defined in the TPC command, and the user equipment may be operated in the legacy mode. In other cases, the user equipment may interpret that the carrier indicator is included in the TPC command, which is received over a random carrier, and may be operated accordingly.

Herein, among the multiple carriers, a portion of the carriers may be defined as the legacy mode, and another portion of the carriers may be configured to have the CI included in the TPC command. In order to prepare for a case when complexity in operation occurs, the above-described configuration may be defined by using an implicit method. However, such configuration may also be notified to the user equipment by using an explicit method, such as RRC signaling. Furthermore, although the information on whether or not a CI exists in the TPC command may be user equipment specifically defined, the information on whether or not a CI exists in the TPC command may also be carrier-specifically defined. Information on whether or not a carrier-specific CI exists in the TPC command may be defined through system information.

Operation Mode 2

The diverse transmit power control methods that can be applied in a wireless communication system supporting multiple carriers, which are proposed in the above-described Operation Mode 1, correspond to methods for ensuring a CIF in a space reserved for the TPC command within the conventional DCI format 3/3A so that the user equipment can decide the corresponding UL carrier and apply the TPC command. Conversely, the Operation Mode 2 corresponds to methods defining the CIF in a space (or room) reserved for a portion of the parity bits when configuring the DCI format 3/3A.

With the exception for defining the CIF in a space reserved for parity bits instead of a space reserved for a TPC command, the CIF may be configured in accordance with principles identical to those of the diverse methods proposed in Operation Mode 1. As described above, the CRC Parity bit of the PDCCH including the DCI format 3/3A may be masked (or scrambled) by the TPC-PUCCH-RNTI or the TPC-PUSCH-RNTI. For example, as shown in FIG. 8, the CRC parity bit of DCI format 3 may be configured to have the length of 16 bits. And, as shown in FIG. 9, the CRC parity bit of DCI format 3A may also be configured to have the length of 16 bits. More specifically, the total length that can be used as the party bit for the DCI format 3/3A may be fixed, and the CIF may be applied by reserving a predetermined space (or room) within the corresponding parity bit. The space for the CIF may be decided to have an adequate length in accordance with a number of UL carriers that can be indicated by the CIF. The size and location of the CIF, which is defined in the parity space (or room) may be notified to the user equipment by using a separate signaling process. Alternatively, the size and location of the CIF may also be decided in accordance with a pre-decided rule shared by the base station and the user equipment.

As described above, when defining the CIF in the parity bit space, the total DCI format size does not change, and only the size of the parity bit should be changed. Accordingly, according to the method proposed in the present invention, when generating a parity bit, it is required to modify the parity bit to best fit the size respective to the reduced CIF length. For example, in case of DCI format 3, when a 2-bit CIF that can indicate 4 UL carriers is defined in the parity bit space, a parity bit having the length of 14 bits, which corresponds to a length reduced by 2 bits from the conventional parity bit length of 16 bits, may be created. In other words, when a CIF having the length of A bits is configured, the parity bit may be configured to have a length of 16−A. Similarly, in case of DCI format 3A, when a CIF having the length of B bits is configured, the parity bit may be configured to have a length of 16−B. Accordingly, in case of the DCI format 3 or 3A, which are modified according to the embodiment of the present invention, the total length including the parity bit may be identically configured as the conventional DCI format 3 or 3A.

As described above, when a CIF is configured within a parity bit space of DCI format 3/3A, the parity bit of the corresponding DCI format 3/3A (i.e., parity bit of the reduced length) may be scrambled to a TPC-PUSCH-RNTI or a TPC-PUCCH-RNTI depending upon its purpose. The PDCCH of such DCI format 3/3A may exist within the common search space of the SL carrier. The user equipment uses the RNTI to perform blind decoding on the PDCCH common search space of the DL carrier, so as to acquire the DCI format 3/3A. Also, the TPC command respective to the corresponding user equipment may be interpreted by using the tpc-Index that is provided by the higher layer.

Even if a CIF exists within a parity bit of the DCI format 3/3A, the legacy user equipment acquires the DCI format 3/3A by performing a blind decoding process using the RNTI, which is identical to that of the conventional method. Thereafter, the user equipment may apply the TPC command, which is indicated by the tpc-Index being provided by the higher layer, to one of its UL carriers. The user equipment supporting the multiple carrier operation may acquire DCI format 3/3A by performing blind decoding using the RNTI. Then, the user equipment may decide to which UL carrier the TPC command corresponds by using the CIF existing in the parity bit space of DCI format 3/3A. Thereafter, the user equipment may apply the TPC command, which is indicated by the tpc-Index being provided by the higher layer, to the decided UL carrier. More specifically, the UL carrier having the TPC command, which is provided through the DCI format 3/3A, may be differently decided depending upon the case when the user equipment corresponds to a legacy user equipment and the case when the user equipment correspond to a user equipment supporting multiple carrier operations. As described above, since the methods proposed in the present invention can be applied without influencing the operations of the legacy user equipment, the transmit power control method proposed in the present invention may be commonly applied to both the legacy user equipment and the user equipment respective to the system supporting multiple carriers. At this point, when designating a range of values for defining a field that can be used as the TPC-PUSCH-RNTI or the TPC-PUCCH-RNTI, which is configured as described above, as a method for supporting the multiplexing between the legacy user equipment and the new user equipment, when the parity bit of the legacy user equipment is equal to 16 bits, and when the parity bit of the new user equipment is equal to K bits, which is less than 16, for all possible cases of 16-K bits corresponding to the MSB or LSB of the RNTI, the range of values for designating the TPC-PUSCH-RNTI or the TPC-PUCCH-RNTI may be dispersed (or scattered) and configured accordingly.

Meanwhile, the entire CRC parity bit of the DCI format 3/3A may be scrambled (or masked) by using the UL carrier specific TPC-RNTI. In this case, the DCI format 3/3A may be defined identically as the conventional format. And, the user equipment may blind decode the PDCCH by using the TPC-RNTI, which is separately defined for each UL carrier, so as to acquire the DCI format 3/3A. Then, a TPC command respective to the corresponding user equipment may be identified from the acquired DCI format 3/3A by using the tpc-Index, which is provided by a higher layer, so as to decide the transmit power of the corresponding UL carrier.

The above-described transmit power control method in the multiple carrier system may also be applied to a case when the DL carrier and the UL carrier are not in a one-to-one mapping relation. When an asymmetry occurs in the mapping relation between the UL carrier and the DL carrier, this case will not be limited only to a case when the DL/UL carriers are system-specifically and asymmetrically determined. In other words, such case may also include a case when the DL/UL carrier asymmetry occurs in a UE-specific DL/UL carrier configuration. Also, even if the DL carrier and the UL carrier are in a one-to-one mapping relation, the above-described method, which is proposed in the present invention, may also be applied in a case when a portion of the DL carrier or a portion of the UL carrier is in an activation/de-activation state.

In case the DL carrier and the UL carrier configure a one-to-one mapping relation in the multiple carrier system, and in case the DL carrier and the UL Carrier configure a mapping relation corresponding to a different ratio in the multiple carrier system, the above-described Operation Modes 1 and 2 may be applied to a case when the CIF is defined, when a TPC command, which is referred to as a TPC-PUCCH-RNTI (or a TPC-PUSCH-RNTI), has a tpc-Index for each carrier.

Operation Mode 3

Operation Mode 3 corresponds to a method of configuring a linkage between the CIF and the tpc-Index.

Basically, in transmitting the PDCCH of DCI format 3/3A, when applying the CIF, a relationship for differentiating each tpc-Index, which indicates the TPC command within the DCI format, for the respective UL carrier may be required to be defined, or such relationship may be required to be signaled.

Among the diverse tpc-Index transmission methods proposed in the above-described Operation Modes 1 and 2, when the CIF is not defined in the DCI format 3/3A, or when only one CIF is applied, all tpc-Indexes that are multiplexed within the DCI format payload of the corresponding PDCCH may be recognized by the user equipment as tpc-Indexes that are commonly applied to the target UL carrier (herein the target UL carrier may be implicitly or explicitly decided).

Meanwhile, a case of applying multiple CIFs within the DCI format 3/3A may be considered. In this case, by additionally applying the diverse embodiments of the present invention, which will be described in detail later on, to the above-described Operation Modes 1 and 2, the UL carrier to which the user equipments are to apply the TPC command may be identified.

Embodiment 1

As shown in the configuration of the DCI format 3/3A, which is defined in the conventional system, in addition to providing a tpc-Index, which provides a TPC command respective to a user equipment group, and which notifies a TPC command that is to be applied for each user equipment through UE-specific RRC signaling, in accordance with a predetermined transmission cycle, information indicating the control information of a UL carrier to which an individual tpc-Index within the DCI format 3/3A belongs may be UE-specifically or cell-specifically notified to the user through higher layer configuration and signaling (e.g., RRC configuration and signaling). Accordingly, in the perspective of an individual user equipment, since full information indicating to which UL carrier each tpc-Index belongs is configured and signaled by a higher layer (RRC), a transmit power control command may be applied to the multiple carrier system without having to adopt a separate CIF within the DCI format 3/3A.

Embodiment 2

When multiple CIFs are included in the PDCCH DCI format 3/3A, information indicating the control information respective to which UL carrier the tpc-Index within the payload corresponds to may be decided through any one of the multiple CIFs. At this point, a linkage between the tpc-Index and the CIF (i.e., information indicating which tpc-Index corresponds to the control information respective to the UL carrier indicated by which CIF, among the multiple CIFs) may be explicitly configured through higher layer (RRC) configuration and signaling. Also, the linkage between the tpc-Index and the CIF may be configured in individual tpc-Index units, or may be configured with respect to tpc-Indexes of predetermined sub-group units.

Embodiment 3

Embodiment 3 corresponds to a method for implicitly configuring the linkage between the tpc-Index and the CIF, as opposed to the above-described Embodiment 2. For example, when multiple CIFs are included in the PDCCH DCI format 3/3A, in accordance with a payload mapping order of the CIF (this order may correspond to an order proceeding along a normal direction starting from the beginning of the payload, or the order may correspond to an order proceeding along a reverse direction starting from the end of the payload), a CIF configuring a linkage with the tpc-Index within a region of a predetermined range within the payload excluding the payload area being mapped of the CIF. Herein, the region of the predetermined range within the payload may be defined in accordance with a separate higher layer (RRC) configuration and signaling, or may be defined in accordance with a pre-decided rule. Accordingly, an application target UL carrier may be designated for a connected bit field configuration between the tpc-Indexes and the CIFs or for the mapping relation respective to a mapping order within regions that are differentiated from one another.

For example, it may be assumed that N number of CIFs are each mapped to a random position within the DCI format 3/3A payload, and that each CIF is serially referred to as a $1^{st}$ CIF, a $2^{nd}$ CIF, . . . , a $N^{th}$ CIF starting from the beginning of the payload. Additionally, it may also be assumed that a $1^{st}$ tpc-Index, a $2^{nd}$ tpc-Index, . . . , a $N^{th}$ tpc-Index are serially defined starting from the beginning of the payload with respect to a region of a predetermined range within the DCI format 3/3A. At this point, when the implicit configuration of the linkage between the tpc-Index and the CIF follows an order along a normal direction, the $1^{st}$ tpc-Index may be linked with the $1^{st}$ CIF, the $2^{nd}$ tpc-Index may be linked with the $2^{nd}$ CIF, and, similarly, the $N^{th}$ tpc-Index may be linked with the $N^{th}$ CIF. Accordingly, a TPC command respective to the $1^{st}$ tpc-Index may be applied to the UL carrier, which is indicated by the $1^{st}$ CIF, a TPC command respective to the $2^{nd}$ tpc-Index may be applied to the UL carrier, which is indicated by the $2^{nd}$ CIF, and, similarly, a TPC command respective to the $N^{th}$ tpc-Index may be applied to the UL carrier, which is indicated by the $N^{th}$ CIF.

Embodiment 4

In this embodiment, when multiple CIFs exist in the PDCCH DCI format 3/3A, in addition to each CIF including a bit field (i.e., a carrier indicator (CI) bit field) designating a UL carrier, to which a TPC command is to be applied, each CIF may explicitly include control information designating a region for tpc-Indexes that are to be actually applied as TPC commands within the corresponding DCI format 3/3A payload (e.g., region excluding the tpc-Index region being mapped to the CIF). Herein, the explicit tpc-Index region designating control information may be configured of a method for indicating a group (or combination) of candidates available as tpc-Indexes.

At this point, the CI bit field and the tpc-Index region designating control information may be defined as a separate bit field, or may also be defined as a single bit field using a predetermined joint coding process.

Operation Mode 4

This operation mode corresponds to a method for configuring a common search space when multiple carriers are being configured in a downlink.

As described above, a method for configuring a CIF, which designates a UL carrier to which the TPC command is to be applied, may be applied in a case when the DL carrier and the UL carrier do not configure a one-to-one mapping relationship (e.g., a case when the determined number of UL carriers is greater than the number of DL carriers, or a case when a cross-carrier scheduling configured by a cell or a network is being applied). In this case, when it is considered that the transmission of SI (system information), PI (paging indication), RAR (random access response), and so on is performed through a common search space, the common search space may become insufficient due to the transmission of the TPC command. In order to resolve this problem, instead of fixing the size of the common search space to 16 CCEs (Control Channel Elements), as in the conventional method, it may be considered to vary the settings for the common search space size depending upon the circumstances. At this point, when it is considered that 4 or 8 is applied as the CCE aggregation level in the common search space, the varied size of the common search space may be designated to have a value greater than 16 and corresponding to a multiple of 4 or a multiple of 8.

The size of a CCE unit of the common search space may be implicitly configured based upon DL carrier and UL carrier settings in the multiple carrier system. As an example of the implicit settings, when the number of configured DL carriers or when the number of activated DL carriers is given as Z, the size of the common search space may be determined to have a value proportional to the value Z. Accordingly, the size of the common search space may be expressed as $$\frac{Z}{\alpha} \cdot 16.$$

At this point, α may be assigned with a random value other than 0. As another example, when the number of configured DL carriers or the number of activated DL carriers is less than a random value (e.g., 3 or 5), the CCE size may be maintained to have a value of 16. And, when the number of configured DL carriers or the number of activated DL carriers is equal to or greater than a random value (e.g., 3 or 5), the CCE size may be determined to have a value greater than the pre-decided value 16 and corresponding to a multiple of 4 or a multiple of 8. Alternatively, the size of the common search space may be configured and signaled through an explicit signaling (e.g., cell-specific RRC signaling, MAC messaging, or L1/L2 PDCCH control signaling).

Figure 13:
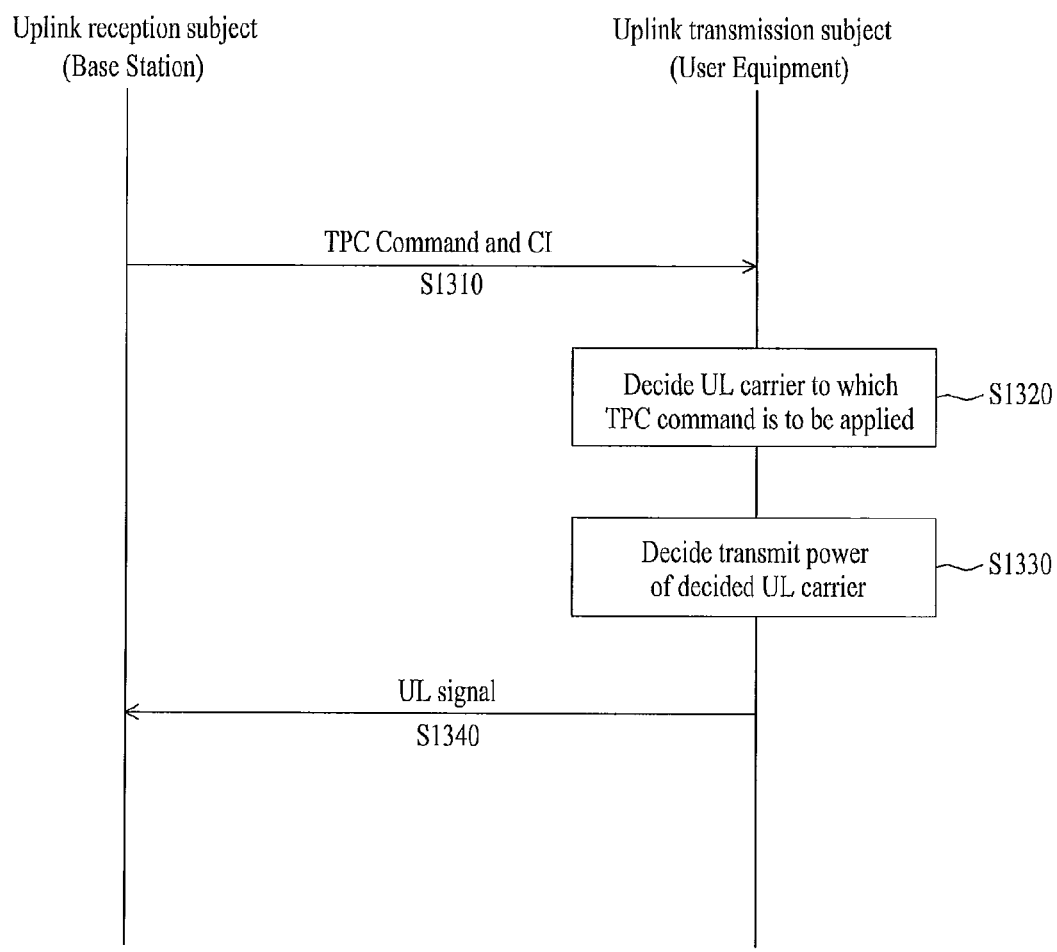
FIG. 13 illustrates a method for controlling an uplink transmission power in a multiple-carrier supporting wireless communication system according to the exemplary embodiment of the present invention.

FIG. 13 illustrates a method for controlling an uplink transmission power in a multiple-carrier supporting wireless communication system according to the exemplary embodiment of the present invention.

In step S1310, the UL reception subject may transmit a DCI including a UL TPC command to the UL transmission subject (i.e., the conventional PDCCH DCI format 3/3A or a modified DCI format 3/3A proposed in the present invention). Additionally, the UL reception subject may also transmit at least one or more UL CI (Carrier Indication) information indicating the UL carrier, to which the UL TPC command is to be applied, to the UL transmission subject. Accordingly, the UL transmission subject may receive a DCI including the TPC command and at least one or more CI information from the UL reception subject.

Herein, the at least one or more CI information may be included in a reserved space (or region) of the TPC command bit within the DCI. Alternatively, the at least one or more CI information may be included in a reserved space (or region) of the parity bit within the DCI. Moreover, the at least one or more CI information may also be provided to the UL transmission subject through a higher layer (e.g., RRC) signaling. Additionally, the at least one or more CI information may also be provided to the UL transmission subject from the UL reception subject, when the downlink carrier and the uplink carrier does not configure a one-to-one mapping relationship, or when a cross-carrier scheduling is performed.

In step S1320, the UL transmission subject may decide the UL carrier to which the TPC command is to be applied, based upon the at least one or more CI information. Herein, when multiple sets of CI information exist, the UL carrier to which the TPC command is to be applied may be decided based upon a linkage configuration between a tpc-Index, which indicates a TPC command respective to the corresponding UL transmission subject, and one of the multiple sets of CI information. The linkage configuration between the CI information and the tpc-Index may be decided by a higher layer signaling, or may be decided in accordance with a order by which the CI information is mapped on the payload.

In step S1330, the UL transmission subject may decide the transmit power over the corresponding UL carrier by applying a TPC command respective to the UL carrier, which is decided in step S1320.

In step S1340, the UL transmission subject may transmit a UL signal to the UL reception subject over the UL carrier, which is decided in step S1320, based upon the transmit power, which is decided in step S1330.

The uplink transmit power control method according to the present invention, which is described above with reference to FIG. 13, is merely a main example of diverse embodiments of the present invention that can be applied to the present invention. And, therefore, the scope of the present invention will not be limited only to the example described and presented herein. More specifically, when applying the method described with reference to FIG. 13, a UL carrier, to which the TPC command is to be applied, may be decided in accordance with the diverse methods proposed in the present invention, and the transmit power (or transmission power) of the UL signal, which is to be transmitted over the UL carrier, may also be decided in accordance with the diverse methods proposed in the present invention. Furthermore, the above-described UL reception subject may correspond to the base station or the relay station (or relay node), and the UL transmission subject may correspond to the user equipment or the relay station.

Figure 14:
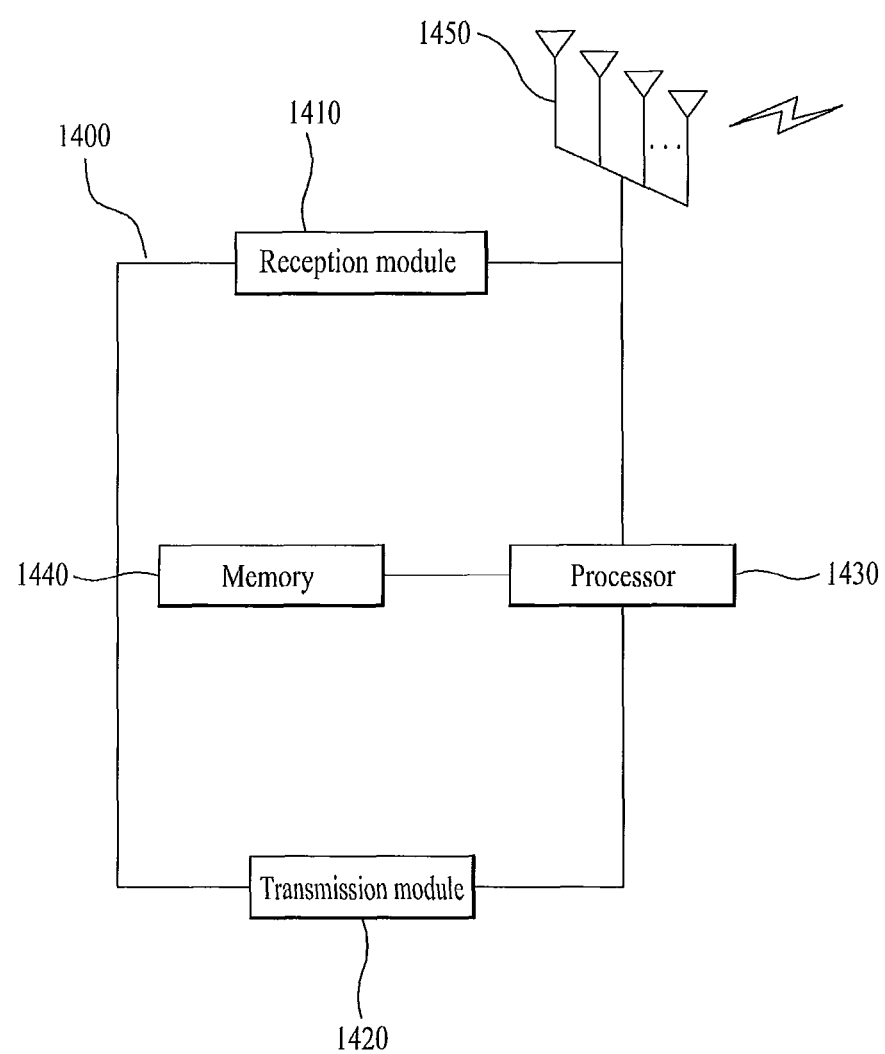
FIG. 14 illustrates the structure of a user equipment device or a base station device according to a preferred embodiment of the present invention.

FIG. 14 illustrates the structure of a user equipment device or a base station device according to a preferred embodiment of the present invention. Hereinafter, although the same reference numerals are used for describing the user equipment device and the base station device, this does not signify that each device has the same configuration. More specifically, in the following description, the structure of each of the user equipment device and the base station device will be separately described.

Referring to FIG. 14, a user equipment device (1400) according to the present invention may include a reception module (1410), a transmission module (1420), a processor (1430), a memory (1440), and a plurality of antennae (1450). Herein, the plurality of antennae signifies that the user equipment device of FIG. 14 supports MIMO transmission and/or reception. The reception module (1410) may receive various types of signals, data, and information via the uplink from the base station. The transmission module (1420) may transmit various types of signals, data, and information via downlink to the base station. The processor (1430) may control the overall operations of the user equipment device (1400).

The user equipment device according to the exemplary embodiment of the present invention may be configured to perform an uplink transmit power control in a wireless communication system supporting multiple carriers. The processor (1430) of the user equipment device may be configured to receive a downlink control information (DCI) including an uplink TPC command and at least one or more sets of uplink carrier indicator (CI) information indicating the uplink carrier, to which the uplink TPC command is to be applied, from the base station through the reception module (1410). Also, the processor (1430) of the user equipment device may be configured to decide the uplink carrier, to which the uplink TPC command is to be applied, based upon the at least one or more sets of CI information, and may also be configured to decide the transmit power respective to the uplink carrier, which is decided based upon the DCI including the TPC command. Furthermore, the processor (1430) of the user equipment may be configured to transmit an uplink signal to the base station through the transmission module (1420), based upon the transmit power, which is decided in the decided uplink carrier.

Additionally, the processor of the user equipment device may perform functions of operating and processing information received by the user equipment device, information that is to be transmitted outside the system, and so on. Furthermore, the memory (1440) may store the operated and processed information for a predetermined period of time. Herein, the memory (1440) may also be replaced by other components such as a buffer (not shown).

Meanwhile, referring to FIG. 14, a base station device (1400) according to the present invention may include a reception module (1410), a transmission module (1420), a processor (1430), a memory (1440), and a plurality of antennae (1450). Herein, the plurality of antennae signifies that the base station device of FIG. 14 supports MIMO transmission and/or reception. The reception module (1410) may receive various types of signals, data, and information via the uplink from the user equipment. The transmission module (1420) may transmit various types of signals, data, and information via downlink to the user equipment. The processor (1430) may control the overall operations of the base station device (1400).

The base station device according to the exemplary embodiment of the present invention may be configured to perform an uplink transmit power control in a wireless communication system supporting multiple carriers. The processor (1430) of the base station device may be configured to transmit a downlink control information (DCI) including an uplink TPC command and at least one or more sets of uplink carrier indicator (CI) information indicating the uplink carrier, to which the uplink TPC command is applied, to the user equipment through the transmission module (1420). Also, the processor (1430) of the base station device may be configured to receive an uplink signal, which is being transmitted from the user equipment, through the reception module (1410) over an uplink carrier, which is decided based upon at least one or more sets of the CI information, at a transmit power (or transmission power), which is decided based upon the DCI including the TPC command.

Additionally, the processor of the base station device may perform functions of operating and processing information received by the base station device, information that is to be transmitted outside the system, and so on. Furthermore, the memory (1440) may store the operated and processed information for a predetermined period of time. Herein, the memory (1440) may also be replaced by other components such as a buffer (not shown).

The detailed configuration of the base station device or the user equipment device (most particularly, the processor of the corresponding device) may be implemented so that the details described in the diverse exemplary embodiments of the present invention (i.e., details on the method for providing diverse CI information proposed in the present invention, details on the method for deciding a UL carrier, to which the TPC command is to be applied, details on the method for deciding the transmit power by applying the TPC command to the UL carrier, and so on) can be identically applied.

Furthermore, in the description of FIG. 14, the description of the base station device may be identically applied to a relay station (or relay node) as a downlink transmission subject or an uplink reception subject, and the description of the user equipment station device may be identically applied to a relay station (or relay node) as a downlink reception subject or an uplink transmission subject.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The present invention may be applied in diverse types of wireless mobile communication systems.

What is claimed is:

1. A method for performing uplink transmit power control at a user equipment in a wireless communication system supporting multiple carriers, the method comprising:
receiving downlink control information and at least one uplink carrier indicator information from a base station, wherein the downlink control information includes an uplink transmit power control command, and wherein the at least one uplink carrier indicator information indicates an uplink carrier to which the uplink transmit power control command is applied;
deciding an uplink carrier, to which the uplink transmit power control command is to be applied, based upon the at least one uplink carrier indicator information;
deciding a transmit power respective to the decided uplink carrier based upon the downlink control information; and
transmitting an uplink signal to the base station based upon the decided transmit power over the decided uplink carrier,
wherein the at least one uplink carrier indicator information is provided either when a downlink carrier and an uplink carrier do not configure a one-to-one mapping relation, or when a cross-carrier scheduling is performed,
wherein a size of a common search space in the downlink control information is determined to be 16 Control Channel Elements (CCEs), when a number of the downlink carriers is less than a predetermined value, and
wherein the size of the common search space in the downlink control information is determined to be a value greater than 16 and a multiple of 4 or 8, when the number of the downlink carriers is equal to or greater than the predetermined value.

2. The method of claim 1, wherein the at least one uplink carrier indicator information is included in a reserved portion, among the transmit power control command bits of the downlink control information.

3. The method of claim 1, wherein the at least one uplink carrier indicator information is included in a reserved portion, among parity bits of the downlink control information.

4. The method of claim 1, wherein the at least one uplink carrier indicator information is provided via higher layer signaling.

5. The method of claim 1, wherein the at least one uplink carrier indicator information is decided based upon linkage settings between a transmit power control command index (tpc-Index) designating the uplink transmit power control command and the at least one uplink carrier indicator information.

6. The method of claim 5, wherein the linkage settings between the transmit power control command index and the at least one uplink carrier indicator information are either decided by performing higher layer signaling, or decided in accordance with a mapping order by which the at least one uplink carrier indicator information is mapped to a payload.

7. The method of claim 1, wherein the predetermined value is 3 or 5.

8. A method for providing uplink transmit power control at a base station in a wireless communication system supporting multiple carriers, the method comprising:
   transmitting downlink control information and at least one uplink carrier indicator information to a user equipment, wherein the downlink control information includes an uplink transmit power control command, and wherein the at least one uplink carrier indicator information indicates an uplink carrier to which the uplink transmit power control command is applied; and
   receiving an uplink signal being transmitted from the user equipment at a transmit power, the transmit power being decided based upon the downlink control information, over the uplink carrier being decided based upon the at least one uplink carrier indicator information,
   wherein the at least one uplink carrier indicator information is provided either when a downlink carrier and an uplink carrier do not configure a one-to-one mapping relation, or when a cross-carrier scheduling is performed,
   wherein a size of a common search space in the downlink control information is determined to be 16 Control Channel Elements (CCEs), when a number of the downlink carriers is less than a predetermined value, and
   wherein the size of the common search space in the downlink control information is determined to be a value greater than 16 and a multiple of 4 or 8, when the number of the downlink carriers is equal to or greater than the predetermined value.

9. The method of claim 8, wherein the at least one uplink carrier indicator information is included in a reserved portion, among the transmit power control command bits of the downlink control information.

10. The method of claim 8, wherein the at least one uplink carrier indicator information is included in a reserved portion, among parity bits of the downlink control information.

11. The method of claim 8, wherein the at least one uplink carrier indicator information is provided via higher layer signaling.

12. The method of claim 8, wherein the at least one uplink carrier indicator information is decided based upon linkage settings between a transmit power control command index (tpc-Index) designating the uplink transmit power control command and the at least one uplink carrier indicator information.

13. The method of claim 12, wherein the linkage settings between the transmit power control command index and the at least one uplink carrier indicator information are either decided by performing higher layer signaling, or decided in accordance with a mapping order by which the at least one uplink carrier indicator information is mapped to a payload.

14. The method of claim 8, wherein the predetermined value is 3 or 5.

15. A user equipment for performing uplink transmit power control in a wireless communication system supporting multiple carriers, the user equipment comprising:
   a reception module configured to receive a downlink signal over at least one downlink carriers from a base station;
   a transmission module configured to transmit an uplink signal over at least one uplink carriers to the base station; and
   a processor configured to control the user equipment including the reception module and the transmission module,
   wherein the processor is configured to:
   receive downlink control information and at least one uplink carrier indicator information from a base station through the reception module, wherein the downlink control information includes an uplink transmit power control command, and wherein the at least one uplink carrier indicator information indicates an uplink carrier to which the uplink transmit power control command is applied,
   decide an uplink carrier, to which the uplink transmit power control command is to be applied, based upon the at least one uplink carrier indicator information,
   decide a transmit power respective to the decided uplink carrier based upon the downlink control information, and
   transmit an uplink signal to the base station through the transmission module, based upon the decided transmit power over the decided uplink carrier,
   wherein the at least one uplink carrier indicator information is provided either when a downlink carrier and an uplink carrier do not configure a one-to-one mapping relation, or when a cross-carrier scheduling is performed,
   wherein a size of a common search space in the downlink control information is determined to be 16 Control Channel Elements (CCEs), when a number of the downlink carriers is less than a predetermined value, and
   wherein the size of the common search space in the downlink control information is determined to be a value greater than 16 and a multiple of 4 or 8, when the number of the downlink carriers is equal to or greater than the predetermined value.

16. A base station for providing uplink transmit power control in a wireless communication system supporting multiple carriers, the base station comprising:
   a reception module configured to receive an uplink signal over at least one uplink carriers from a user equipment;
   a transmission module configured to transmit a downlink signal over at least one downlink carriers to the user equipment; and
   a processor configured to control the base station including the reception module and the transmission module,
   wherein the processor is configured to:
   transmit downlink control information and at least one uplink carrier indicator information to a user equipment through the transmission module, wherein the downlink control information includes an uplink transmit power control command, and wherein the at least one uplink carrier indicator information indicates an uplink carrier to which the uplink transmit power control command is applied, and
   receive an uplink signal being transmitted from the user equipment through the reception module at a transmit power, the transmit power being decided based upon the downlink control information, over the uplink carrier being decided based upon the at least one or more uplink carrier indicator information,
   wherein the at least one uplink carrier indicator information is provided either when a downlink carrier and an uplink carrier do not configure a one-to-one mapping relation, or when a cross-carrier scheduling is performed,
   wherein a size of a common search space in the downlink control information is determined to be 16 Control Channel Elements (CCEs), when a number of the downlink carriers is less than a predetermined value, and
wherein the size of the common search space in the downlink control information is determined to be a value greater than 16 and a multiple of 4 or 8, when the number of the downlink carriers is equal to or greater than the predetermined value.

* * * * *